US008352986B2

(12) United States Patent
Uchida et al.

(10) Patent No.: US 8,352,986 B2
(45) Date of Patent: Jan. 8, 2013

(54) IMAGE DISPLAY SYSTEM, IMAGE DISPLAY METHOD AND DISPLAY UNIT

(75) Inventors: Mami Uchida, Saitama (JP); Tatsuya Yokoyama, Tokyo (JP); Yuka Ohashi, Tokyo (JP); Ayumi Mizobuchi, Tokyo (JP); Jin Sato, Tokyo (JP); Yushi Sayama, Tokyo (JP)

(73) Assignee: Sony Corporation, Tokyo (JP)

( * ) Notice: Subject to any disclaimer, the term of this patent is extended or adjusted under 35 U.S.C. 154(b) by 778 days.

(21) Appl. No.: 10/520,356

(22) PCT Filed: Jun. 26, 2003

(86) PCT No.: PCT/JP03/08141
§ 371 (c)(1),
(2), (4) Date: Jan. 4, 2005

(87) PCT Pub. No.: WO2004/006563
PCT Pub. Date: Jan. 15, 2004

(65) Prior Publication Data
US 2005/0262535 A1  Nov. 24, 2005

(30) Foreign Application Priority Data
Jul. 5, 2002  (JP) ................. P2002-197683

(51) Int. Cl.
*H04N 5/445* (2006.01)
*H04N 7/18* (2006.01)
*H04N 7/173* (2006.01)
*H04N 7/16* (2006.01)

(52) U.S. Cl. ............. 725/48; 725/78; 725/133; 725/141

(58) Field of Classification Search .................... 725/48, 725/78, 133, 141
See application file for complete search history.

(56) References Cited

U.S. PATENT DOCUMENTS
5,500,794 A * 3/1996 Fujita et al. .......... 700/83
(Continued)

FOREIGN PATENT DOCUMENTS
JP  9-298677  11/1997
(Continued)

OTHER PUBLICATIONS

Communication pursuant to Article 94(3) EPC for Application No. 03736280.3-2202 dated Mar. 8, 2010, from the European Patent Office in a counterpart European patent application (5 pages).

*Primary Examiner* — Pankaj Kumar
*Assistant Examiner* — Franklin Andramuno
(74) *Attorney, Agent, or Firm* — Finnegan, Henderson, Farabow, Garrett & Dunner, L.L.P.

(57) ABSTRACT

A picture display system having two display devices and a base device for supplying picture signals to one of the display devices and capable of having bidirectional communication with the other display device is disclosed. The picture display system (1) is made up by a mobile display device (100), a base device (200) and a large format display device (300). The base device (200) sends picture signals to the display device (100) and to the large format display device (300). On a display image surface of the mobile display device (100), there is provided a touch panel for detecting the contact position contacted by a user for displaying a remote-control panel RP accepting an operating input from the user on the display image surface. An operating signal conforming to a display item of the remote-control panel RP, displayed at a contact position, detected by the touch panel, is generated and transmitted by wireless communication to the base device (200). This base device (200) selects the picture signals, supplied from the external inputting devices (400), as a supply source of picture signals, responsive to an operating signal, to transmit the so selected picture signals to the large format display device (300).

19 Claims, 15 Drawing Sheets

U.S. PATENT DOCUMENTS

| | | | |
|---|---|---|---|
| 6,097,441 A * | 8/2000 | Allport | 348/552 |
| 6,104,334 A * | 8/2000 | Allport | 341/175 |
| 6,407,779 B1 * | 6/2002 | Herz | 348/734 |
| 6,862,741 B1 * | 3/2005 | Grooters | 725/39 |
| 2001/0021998 A1 * | 9/2001 | Margulis | 725/81 |
| 2002/0054028 A1 | 5/2002 | Uchida et al. | |
| 2003/0233660 A1 * | 12/2003 | Slemmer et al. | 725/80 |
| 2004/0237104 A1 * | 11/2004 | Cooper et al. | 725/38 |
| 2005/0120376 A1 * | 6/2005 | Slemmer et al. | 725/88 |

FOREIGN PATENT DOCUMENTS

| | | |
|---|---|---|
| JP | 09-298677 | 11/1997 |
| JP | 2000-83178 | 3/2000 |
| JP | 2001-103335 | 4/2001 |
| JP | 2002-34023 | 1/2002 |

* cited by examiner

IMAGE DISPLAY SYSTEM, IMAGE DISPLAY METHOD AND DISPLAY UNIT

TECHNICAL FIELD

This invention relates to a picture display system having two display devices and a base device for supplying picture signals to one of the display devices and capable of having bidirectional communication with the other display device. This invention also relates to a picture display method for the picture display system, and to a display apparatus used in this picture display system and capable of having bidirectional communication with the base device.

This application claims priority of Japanese Patent Application No. 2002-197683, filed in Japan on Jul. 5, 2002, the entirety of which is incorporated by reference herein.

BACKGROUND ART

In adjusting the picture quality or setting the timer in e.g. a TV receiver, a menu for selecting the processing that may be executed is displayed on a display image surface of a TV receiver by e.g. button actuation of a remote controller of the TV receiver. A user selects the targeted processing, using the remote controller of the TV receiver, and actuates the remote controller in accordance with guidance commands demonstrated on the display image surface to carry out targeted processing, such as adjustment of the picture quality or timer setting.

In a receiver for receiving satellite broadcast (BS) signals, termed STB (set-top box) or IRD (integrated receiver decoder), data indication, such as electronic program guide, termed EPG, is demonstrated on a display image surface of a monitor receiver. In this case, the user selects the program, desired to be viewed, on the basis of the electronic program guide demonstrated on the display image surface of the monitor receiver, in order to change the selected channel of the receiver.

In this manner, in a TV receiver or a receiver for receiving TV broadcast signals, various artifices are used to enable the targeted processing to be executed comprehensibly and with relative ease, by combining the menu, guidance or the information display, such as electronic program guide, with the remote controller operation.

However, with the system in which, for having the TV receiver, STB or the IRD perform the targeted operations, the needed information, such as menu or guidance, is demonstrated on the display image surface, and a remote controller is actuated, as the user views the so displayed information, the remote controller operation tends to be complicated.

For example, there are occasions where the menu page feed needs to be carried out a plural number of times, the remote controller operation must be repeated for causing cursor movement on the display image surface or decision operations must be carried out through the remote controller, in order to display a menu including the targeted processing as selected items from plural menus.

It may be contemplated that, with use of an LCD (liquid crystal display) for a monitor device for a TV receiver, the tendency is that the monitor device is reduced in size and weight and portable, such that the monitor device is used at a location within the reach of the user's arm. In such case, the user will feel that the remote controller of the TV receiver is unnecessary, while the remote controller of an external input device, such as a receiver for supplying picture or speech signals to the TV receiver, may, if possible, be dispensed with.

With this in mind, the present Assignee has already proposed in e.g. the Japanese Patent Application Laid-Open Publication No. 2002-34023 a bidirectional communication system in which the picture information, such as TV programs, may be viewed or the speech information may be heard, using a display device, the base device or the external input device connected to the base device may be remote-actuated using the display information for operation displayed on display elements of the display device, in order to enable the remote operation to be carried out without complicated operations, and in order to enable the construction of the home network more friendly to the user.

Meanwhile, in the bidirectional communication system, described in the Japanese Patent Application Laid-Open Publication No. 2002-34023, the base device or the external input device connected to the base device may be remote-operated, through the display information for operation, demonstrated on the display elements of the display device, in such a manner that the desired picture may readily be selected and demonstrated on the display device.

DISCLOSURE OF THE INVENTION

It is an object of the present invention to provide a novel picture display system, a picture display method and a display device employing the above-described bidirectional communication system.

It is another object of the present invention to provide a picture display system and a picture display method in which, in supplying picture signals from the base device to two or more display devices, the base device may be remote-operated from one display device to enable pictures to be displayed on the other display device, through the use of the above-described bidirectional communication system, and a display device in such image display system in which it is possible to remote-operate the base device.

For accomplishing the above object, a picture display system according to the present invention includes first and second display devices and a base device for supplying picture signals to at least the first display device. The first display device includes a picture display unit for displaying the picture signals supplied from the base device. The second display device includes a display unit for displaying the display information for operation, for accepting an operating input from a user, an operating input accepting means for accepting an operating input from a user, an operating signal generating means for generating operating signals conforming to display items of the display information for operation, as specified by the operating input accepting means, and a communication means for transmitting the operating signals to the base device. The base device includes a picture signal outputting a means for outputting the picture signals at least to the first display device, a communication means for receiving the operating signals at least from the second display device, an external input device connecting means for connecting the base device to an external input device as a source of supply of the picture signals, and a control signal transmitting means for transmitting an external input device control signal, controlling the external input device, based on the operating signal, to the external input device.

With the picture display system according to the present invention, an operating signal conforming to an operating input from a user is generated in the second display device and transmitted to the base device. The external input device, as a supply source of picture signals, coupled to the base device, is controlled based on the operating signal to send a desired picture to the first display device for display thereon.

The second display device, accepting the operation from the user, may be operated as a remote operating device for the first display device.

The operating input accepting means of the second display device may include the contact position detection means for detecting a contact position on a display surface of the display unit adapted to be contacted by a user. The operating signal generating means may generate an operating signal conforming to a display item of the display information for operation displayed at a contact position on the display image surface detected by the contact position detection means.

The communication means of the base device may transmit at least a response signal to the operating signal to the display device, and the communication means of the second display device may receive the response signal.

The base device may further include tuner means and send picture signals selected by the tuner means based on the operating signal via the picture signal outputting means to the first display device.

The first display device further may include tuner means and display picture signals selected by the tuner means based on an operating signal from the base device on the picture display unit.

The control signal transmitting means of the base device may transmit the external input device control signal for the external input device over a wireless route.

The control signal transmitting means of the base device may transmit the external input device control signal for the external input device by infrared signals over a wireless route.

The base device forming the picture display system according to the present invention may further include receiving means connected to a communication network and adapted for receiving information signals transmitted through the communication network, transmission control means for performing control for transmitting the information signals to a specified display device in case the operating signal is a transmission command for transmitting the information signals to the first display device and/or the second display device, and transmission information transmitting means which, in case the operating signal is the transmission information to be sent to a counterpart connected to the base device over the communication network, sends the transmission information over the communication network to the target counterpart.

The display information for operation may be transparently displayed on the display image surface.

The external input device connecting means may be connected via an amplifier to the external input device as a source of supply of the image signals.

The second display device may have an interlock/non-interlock function of selecting whether or not picture signals supplied to the first display device are to be switched in association operatively with display contents of the display information for operation. That is, with the interlocked operation, the input of the first display device may also be changed over in association operatively with the switching of the display information for operation. With the non-interlocked operation, the display contents of the display information for operation may be changed over without changing over the input of the first display device.

The picture displaying method of the picture display system, including first and second display devices and a base device for supplying picture signals to at least the first display device, comprises an accepting step of accepting an operating input from a user based on the display information for operation on a display image surface of the second display device, an operating signal generating step of generating an operating signal conforming to a display item of the display information for operation, specified by the accepting step, an operating signal transmitting step of transmitting the operating signal to the base device via bidirectional communication means exchanging signals between the second display device and the base device, and an external input device controlling step of controlling an external input device as a supply source of the picture signals based on the operating signal.

A display apparatus according to the present invention comprises communication means for exchanging signals with a base device connected to an external input device as a supply source of a plurality of picture signals and adapted for supplying preset picture signals to at least one picture display device, display means for displaying the display information for operation for accepting an operating input from a user, operating input accepting means for accepting an operating input from a user, and operating signal generating means for generating an operating signal conforming to a display item of the display information for operation specified by the operating input accepting means. The operating signal is sent over the communication means to the base device, and the base device sends a preset image signal from the external input device to the picture display device for display thereon.

Other objects and advantages, to be derived from the present invention, will become apparent from the following description of the preferred embodiments when taken in conjunction with the drawings.

BEST MODE FOR CARRYING OUT THE INVENTION

A picture display system according to the present invention and a picture display system and apparatus used in this picture display system are hereinafter explained in detail with reference to the drawings.

In the following example, the present invention is applied to a picture display system having a large format display device (first display device), a mobile display device (second display device) and a base device (base station) for supplying pictures at least to this large format display device. The base device is remote-controlled by wireless communication by the mobile display device to control the external input device supplying a picture to the large format display device to effect wireless bidirectional communication between the base device and the mobile display device adapted for displaying a picture on the large format display device.

Figure 1:
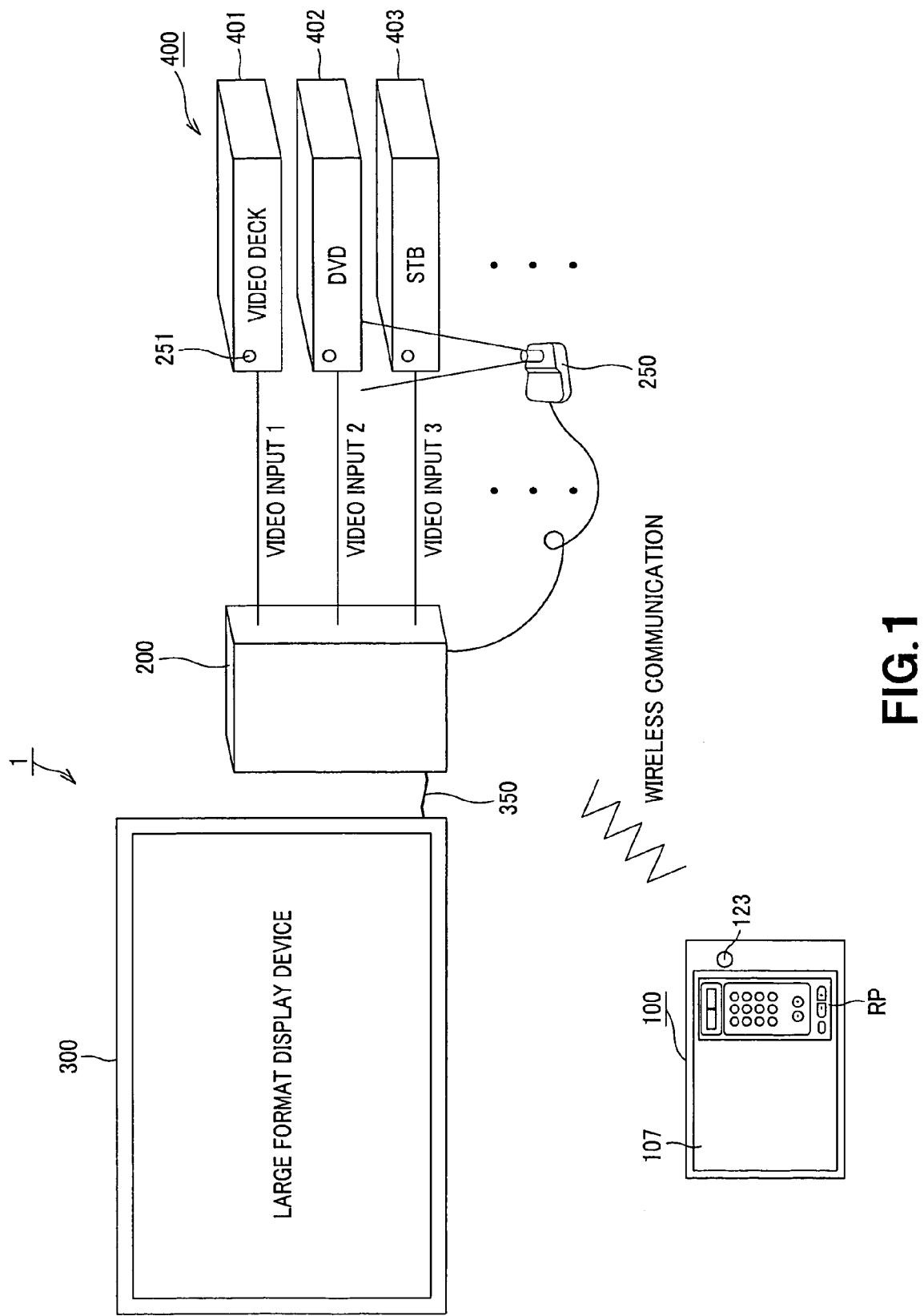
FIG. 1 is a schematic view showing a picture display system according to the present invention.

FIG. 1 schematically shows a picture display system according to the present invention. Referring to FIG. 1, the picture display system includes a mobile display device 100 (second display device) 100, such as a liquid crystal display device, having an LCD 107 as a display unit, a base device (base station) 200, and a large format display device (first display device) 300, such as a large format plasma display device, connected to this base device 200 over a dedicated connection cable 350. A plural number of external inputting devices (external inputting equipment) 400, as supply sources for picture signals, are connected to the base device 200. The picture signals, supplied from these external inputting devices 400, are supplied via base device 200 to the mobile display device 100 and to the large format display device 300 for display thereon. The mobile display device 100 is able to communicate by wireless communication with the base device 200 to receive signals from and to transmit signals to the base device 200.

The base device 200 includes an external input terminal (external input device connecting means), not shown, and may be connected to a variety of external input devices 400, such as VTR (video tape recorder), STB (set top box), IRD (integrated receiver-decoder) or DVD (Digital Versatile Disc). The external input devices 400 may be exemplified by, for example, a video deck 401, a DVD 402 and a STB 403, such as BS (broadcast satellite) digital tuner. In the present embodiment, the base device 200 is provided with seven external input terminals for connection to the external input equipment and hence may be connected to seven external inputting devices. It is however possible to provide any suitable optional number of external input terminals as necessary.

The base device 200 is supplied with picture signals or speech signals of satellite broadcast programs from e.g. the STB 403 of the external inputting devices 400. These information signals are sent over the connection cable 350 to the large format display device 300, while being supplied by wireless signals to the mobile display device 100.

Referring to FIG. 1, the mobile display device 100 is able to display a panel for remote operation (display information for operation) RP, having the α blend (transparent) display function for accepting an operating input controlling the external inputting devices 400. This panel for remote operation, referred to below as remote-control panel, may be displayed as necessary on the LCD 107. A user is able to remote-operate the base device 200 via this remote-control panel RP to select picture signals supplied from the external inputting devices 400 for display on the mobile display device 100 and on the large format display device 300. The mobile display device 100 is provided with a remote-control button 123, by which the remote-control panel RP may be displayed.

The remote-control panel RP is a so-called software key displayed by the software run by a controller of the mobile display device 100. On the LCD 107 is bonded a touch panel (contact position detection means) for detecting the contact position on the display surface of the LCD 107, contacted by the user. An operating input from the user may be accepted based on the display on the remote-control panel RP and the touch panel.

The remote-control panel RP includes e.g. a power supply on/off key, a number key for channel selection, channel up/down key and a sound volume up/down key.

When touched by e.g. the user's finger, the touch panel of the mobile display device 100 detects this contact position (coordinate position) to discriminate the operating key (operating item) forming the remote-control panel RP displayed at the contact position. The mobile display device 100 forms an operating signal conforming to this operating key to transmit the operating signal to the base device 200 via wireless route.

Based on the remote-control panel RP and the touch panel, displayed on the LCD 107 of the mobile display device 100, the user effects an operating input for the external inputting devices 400, by a so-called one-touch operation, to remote-control the external inputting devices 400 through the base device 200 to display a desired picture on the large format display device 300. In this manner, bi-directional communication is possible between the mobile display device 100 and the base device 200.

Meanwhile, a remote signal transmitter (remote-control mouse) 250, for transmitting infrared remote-control signals, is connected to the base device 200 to generate a remote control signal conforming to the operating signal from the mobile display device 100 to send the signal to the external inputting device 400. This external inputting device 400 includes a remote control signal receiving unit 251, such as a photodetector, for receiving remote control signals of the infrared light. The external inputting device 400 receives a remote-control signal from the remote control mouse 250 of the base device 200, and may be remote-controlled, responsive to this remote-control signal, for turning the power supply of the external inputting device 400 on or off.

The base device 200 also includes a tuner means to receive TV broadcast signals to send the so received TV broadcast signals to the large format display device 300.

The mobile display device 100 is small-sized and lightweight and connected to the base device 200 by wireless communication, so that the mobile display device 100 is transportable. The user may carry the mobile display device to any place within a sphere of possible communication with the base device 200.

Thus, the user is able to use the mobile display device 100, in order to transmit a TV broadcast program, as selected by the tuner of the base device 200, satellite broadcast programs provided by the satellite broadcast signals, as selected by the STB 403, connected as the external inputting device to the base device 200, or motion pictures, reproduced by a VTR or a DVD device, to the large format display device 300, for viewing.

It is moreover possible to acquire the information of the so-called home page, provided on a communication network, such as the Internet, from the mobile display device 100, to view the information of the home page, to receive an E-mail addressed to the user to display the E-mail on the LCD 107, or to prepare and send an E-mail to a counterpart party of destination, through a modem of the base device 200.

In preparing an E-mail, a software keyboard, composed of alphabet keys or Japanese 50-syllable keys, on the LCD 107, by performing preset operations on the mobile display device 100, to prepare the E-mail through this software keyboard and the touch panel. By performing preset operations, such as acting on transmitting keys, the E-mail prepared may be sent to the base device 200 and thence to the target counterpart party.

Thus, the base device 200 acts as a base for connecting a variety of information transmission media, including the external inputting devices, such as STB 403, ground wave TV broadcast or communication networks, such as the Internet, to the mobile display device 100. By remote operating the base device 200 by the mobile display device 100, information signals can be supplied to the large format display device 300 from the base device 200, reproduced and output for presentation to the user. On the other hand, the mobile display device 100 is able to form the information for transmission, such as the E-mail, to transmit the information via the base device 200.

Figure 2:
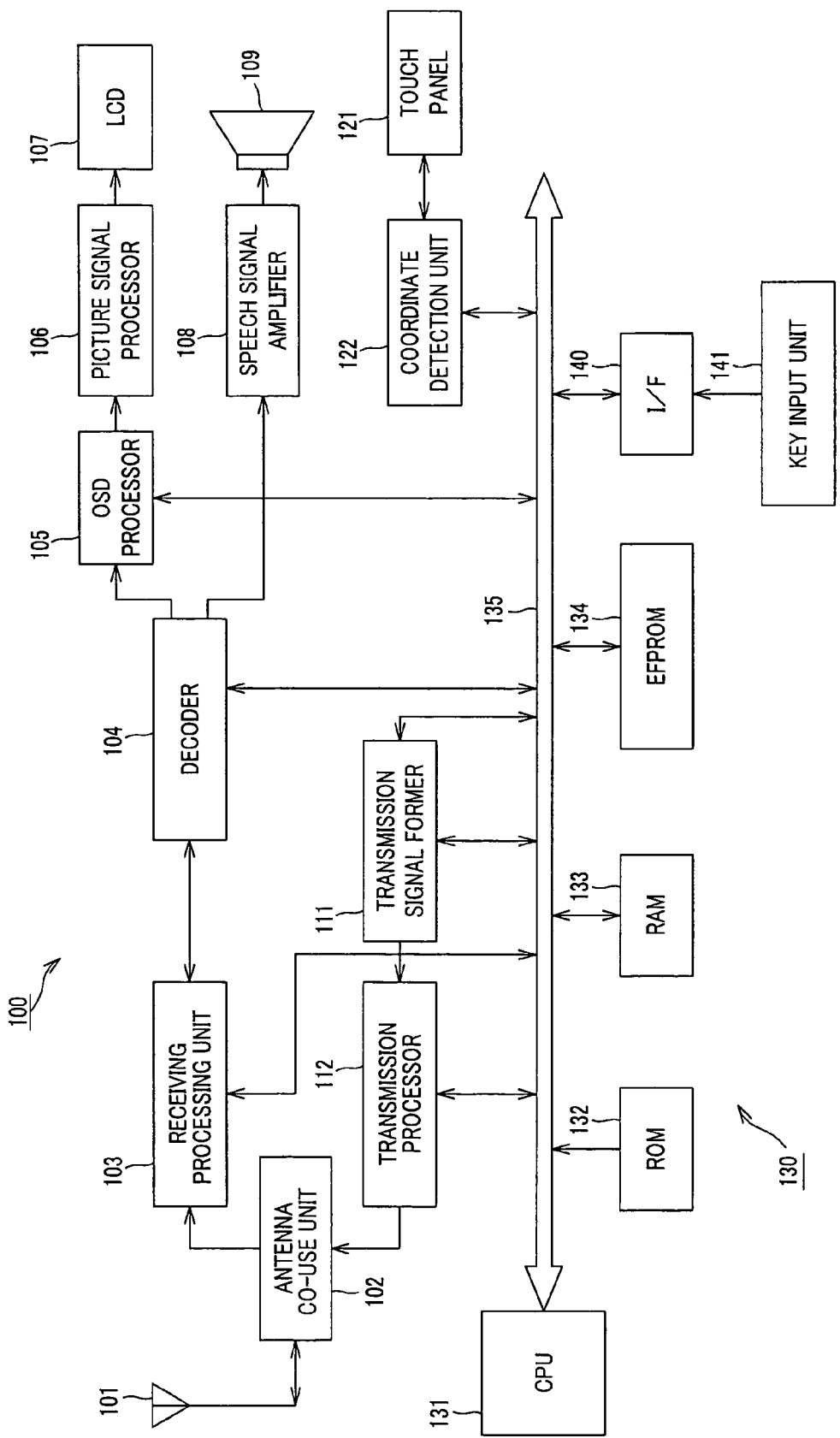
FIG. 2 is a block diagram showing a mobile type display apparatus forming a picture display system according to the present invention.

The various devices that make up the bidirectional communication system, according to the present invention, are hereinafter explained. First, the mobile display device 100 of the picture display system is explained. FIG. 2 is a block diagram showing the mobile display device 100 forming the picture display system according to the present invention. Referring to FIG. 2, the mobile display device 100 includes a transmitting/receiving antenna 101, a antenna co-use unit 102, a receiving processing unit 103, a decoder 104, an OSD (on-screen display) processor 105, a picture signal processor 106, an LCD 107, a speech signal amplifier 108, a loudspeaker 109, a transmission signal former 111, a transmission processor 112, a touch panel 121 and a coordinate detection unit 122.

The various parts of the mobile display device 100 are controlled by a controller 130. The controller 130 is a microcomputer composed of a CPU (central processing unit) 131, a ROM (read-only memory) 132, a RAM (random-access memory) 133, and an EEPROM (electrically erasable programmable read-only memory) 134, interconnected over a CPU bus 135.

The ROM 132 has recorded therein data needed for processing or a variety of processing programs run on this mobile display device 100. The RAM 133 is used mainly as a work area for a variety of processing operations, such as transient storage and retention of data obtained in various processing operations.

The EEPROM 134 is a so-called non-volatile memory. Even on power down, the information stored and held in the EEPROM is not lost. The EEPROM memorizes and holds a variety of setting parameters, home pages on the Internet, acquired through the base device 200, E-mails prepared and transmitted through the base device 200, or received E-mails.

The operation of the mobile display device 100 in receiving wireless signals from the base device 200 is now explained.

Between the mobile display device 100 and the base device 200, wireless communication takes place using a preset protocol, e.g. the protocol of the IEEE (Institute Electrical and Electronics Engineers) 802.11 system or a protocol corresponding to the extension thereof.

The wireless signals, conforming to the preset communication protocol from the base device 200, are received by the transmitting/receiving antenna 101 of the monitor device 100, and supplied through an antenna co-use unit 102 to the receiving processing unit 103. The role of the antenna co-use unit 102 is to prevent interference of the transmitted signals and the received signals.

That is, the present monitor device 100 is able to receive signals from the base device 200 through the transmitting/receiving antenna 101, as well as to transmit e.g. operating signals form the own device by a wireless route over the transmitting/receiving antenna 101. Hence, the antenna co-use unit 102 prevents transmitted signals from the transmission processor 112 from interfering with signals received over the antenna co-use unit 102.

The receiving processing unit 103 demodulates signals supplied thereto, in order to send the as-demodulated signals to the decoder 104 (decompression processor). The base device 200 compresses picture signals and speech signals of the TV broadcast programs of the ground wave, as selected by enclosed first and second tuners 201, 202, display data, such as text data or picture data, or speech data, received via the own modem, or information signals, such as picture signals or speech signals of BS programs form the STB, to transmit the so compressed data.

The decoder 104 of the mobile display device 100 is supplied with demodulated compressed signals from the receiving processing unit 103 and separates the picture signals and the speech signals from each other to expand (decompress) the separated signals to restore the original signals (pre-compression signals).

The decoder 104 D/A-converts the restored picture and speech signals to form analog picture and speech signals. The decoder 104 sends the analog picture signals to the OSD processor 105, while sending the analog speech signals to the speech signal amplifier 108.

The OSD processor 105 is responsive to data sent from the controller 130 to perform video signal processing for executing remote-control panel RP or menu display or display of various messages described above. Specifically, the OSD processor 105 is a so-called text/graphic processing circuit for carrying out the text, pictograms or symbols, other than the pictures of the broadcast programs.

For example, if the remote-control button 123, shown in FIG. 1, is used to display the remote-control panel RP, responsive to a command from the user, the information for the display is sent from the controller 130 to the OSD processor 105. The picture signals from the decoder 104 and the information for displaying the remote-control panel RP from the controller 130 are synthesized together and sent to the picture signal processor 106.

For displaying the letter/character information, indicating the channel, or a sound volume bar, indicating the sound volume level, selected responsive to a command from a user, the information indicating these is sent from the controller 130 to the OSD processor 105. The picture signals from the decoder 104 and the information indicating the letter/character information or the sound volume bar indicating the sound volume, supplied from the controller 130, are synthesized together and sent to the picture signal processor 106.

If there is no necessity for synthesizing the display information, such as the remote-control panel RP, to the picture signals, no display information is sent to the OSD processor 105. Hence, the analog picture signals are directly transmitted to the picture signal processor 106. This picture signal processor 106 forms display signals from the picture signals, supplied through the OSD processor 105, to send the so formed display signals to the LCD 107.

This displays a picture corresponding to the picture signals transmitted over a wireless route from the base device 200. If the display information, such as the remote-control panel RP, has been synthesized to the picture signals in the OSD processor 105, the display information, such as the remote-control panel RP, is displayed, along with the picture corresponding to the picture signals from the decoder 104.

The speech signal amplifier 108 amplifies the signals, supplied thereto, to a preset level, to supply the so amplified speech signals to the loudspeaker 109. This radiates the speech, corresponding to the speech signals, transmitted over a wireless route from the base device 200.

In this manner, it is possible for the mobile display device 100 to receive picture signals or speech signals, such as TV broadcast programs, transmitted over a wireless route from the base device 200, to reproduce the so received picture signals or speech signals to output the so reproduced signals for presentation to a user.

The mobile display device 100 operates as a remote operating device for accepting an operating input from the user by the remote control panel RP displayed on the LCD 107 and the touch panel 121 bonded to the surface of the LCD 107 and for transmitting an operating signal corresponding to the operating input to the base device 200.

The mobile display device 100 detects, by a coordinate detection unit 122, a contact position (coordinate position) on a touch panel 121, touched by e.g. a user's finger. Based on a detection output by the coordinate detection unit 122, the controller 130 discriminates an operating input from the user to form an operating signal associated with the operating input. The controller 130 sends an operating signal, associated with the operating input, to the transmission signal former 111. The transmission signal former 111 forms a transmission signal, to be transmitted to the base device 200, from the operating signal from the operating signal from the controller 130, and sends the so formed transmission signal to the transmission signal former 111. The transmission signal former 111 forms a transmission signal, to be transmitted to the base device 200, from the operating signal from the operating unit 130, and sends the so formed signal to the transmission processor 112. The transmission processor 112 modulates or amplifies the transmission signals, sent thereto, to form transmission signals to be actually transmitted, and transmits the so formed transmission signals to the base device 200 via transmitting/receiving antennas 101 and the antenna co-use unit 102. In this manner, the operating signal, transmitted over a wireless route from the mobile display device 100, are received by the base device 200.

To the mobile display device 100 is connected a key inputting unit 141 over an interfacing unit (I/F) 140. The key inputting unit 141 is provided e.g. with a power supply on/off switch. The operating input, accepted via the key inputting unit 141, is supplied via I/F 140 to the controller 130, whereby the processing may be carried out in keeping with the operating key, such as power up.

Figure 3:
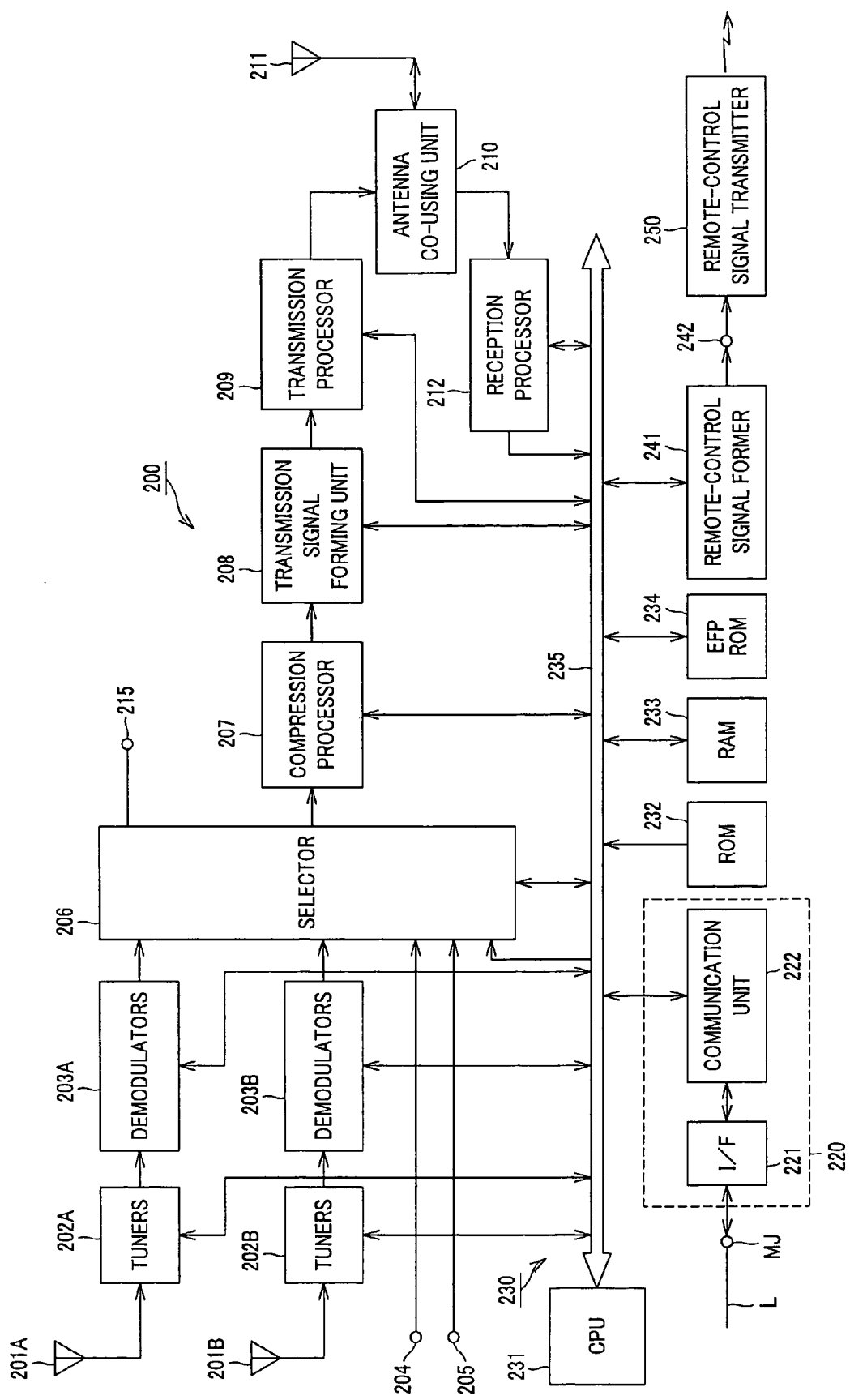
FIG. 3 is a block diagram showing a base device forming the picture display system according to the present invention.

The base device 200 is now explained in detail. FIG. 3 is a block circuit showing the base device 200 in the picture display system 1 according to the present invention. Referring to FIG. 3, the base device 200 includes first and second tuners 202A, 202B for selecting TV broadcast signals, and a modulator/demodulator (modem) for connection to the communication network, such as telephone network or the Internet, for connection to the telephone network over a telephone line L. In FIG. 3, a terminal MJ is a connection terminal (modular jack) to the telephone line L incoming from outside. The base device 200 includes a plural number of external input terminals 204, 205 (only two being shown in FIG. 3). For example, a variety of external input equipment 400, such as VTR, STB, IRD or DVD devices, may be connected to the base device 200.

This base device 200 is able to send information signals, such as picture signals or speech signals of the TV broadcast programs, selected by the own tuners 202A, 202B and demodulated, picture signals or speech signals of satellite broadcast programs from the STB, to the mobile display device 100 or to the large format display device 300.

That is, the base device 200 includes tuners 202A, 202B, connected to receiving antennas 201A, 201B, demodulators 203A, 203B, a picture signal input terminal 204, a speech signal input terminal 205, a selector 206, a compression processor 207, a transmission signal forming unit 208, a transmission processor 209, a antenna co-use unit 210, a transmitting/receiving antenna 211, and a reception processor 212, as shown in FIG. 3.

The various parts of the base device 200 are controlled by a controller 230, formed by a micro-computer, formed by connection of a CPU 231, a ROM 232, a RAM 233 and a EEPROM 234 over a connection bus 235.

The transmitting/receiving antenna 211 is a bidirectional communication means with the mobile display device 100. An operating signal, generated responsive to the operating input from the user, is received via the transmitting/receiving antenna 211 by the reception processor 212. The operating signal, received by the reception processor 212, is sent to the controller 230. In this manner, the controller 230 of the base device 200 performs control so that the information signals (picture signals) conforming to the user's request is supplied from an output terminal 215 over a connection cable 350 shown in FIG. 1 to the large format display device 300.

The ROM 232 has recorded therein a variety of processing programs run by the base device 200 according to the present invention and data needed for processing. The RAM 233 is used as a work area for carrying out various operations, such as transiently holding and storing data obtained in the various processing operations.

The EEPROM 234 is a so-called non-volatile memory in which the information stored and held therein is not lost even on power down. This EEPROM memorizes and holds the information of the broadcast channel selected directly before power down of the main power supply of the base device 200 and, after power up, selects the broadcast signals of the channel selected directly before the previous power down by way of realizing the so-called last chance memory function.

A modem 220 is connected to a CPU bus 235. The MODEM 220 is made up by an interfacing unit (I/F) 221 and a communication unit 222. In the present embodiment, the I/F 221 is an interface between the telephone network and the base device 200, and receives signals sent over the telephone network or transmits signals from the base device 200 to the telephone network, responsive to operating signals sent from the mobile display device 100.

The communication unit 222 demodulates signals received via I/F 221 to send the demodulated signal to the controller 230. In this manner, various data may be transmitted to or received from the counterpart party to whom has been connected the telephone network.

This base device 200 is connected to the Internet via modem 220, telephone network L, and preset ISP (Internet Service Provider), so as to be supplied with various information data or transmit/receive E-mails. In this manner, the controller 230 is able to control the modem 220 to perform off-hook or on-hook operations, responsive to the operating signal, sent from the mobile display device 100, The controller also has the function as a so-called dial for sending out dial signals to the telephone network in case the modem 220 is controlled to perform the off-hook operation.

The base device 200 is electrically connected, via external input terminals 204, 205, to the external inputting devices 400, and is responsive to the operating signal sent from the mobile display device 100 to select picture signals sent from the external inputting devices 400 to send the so selected signals to the large format display device 300.

Although not shown, a key input unit, provided with a power supply on/off key or a variety of setting keys, is connected to the controller 230, so that main power supply on/off of the base device 200 or a variety of setting input operations may be performed through the key inputting unit.

The tuners 202A, 202B of the base device 200 select TV broadcast signals of the channel corresponding to station selection command signal from the controller 230, from the TV broadcast signals, input over the receiving antennas 201A, 201B, to send the so selected TV broadcast signals to the demodulators 203A, 203B. The demodulators 203A, 203B demodulate the TV broadcast signals, supplied thereto, to send the demodulated signals (signals of the TV program) to the selector 206.

This selector 206 is also supplied not only with picture signals, input through the external input terminal 204, and speech signals, entered through the external input terminal 205, but also with the information from the controller 230. The information supplied from the controller 230 to the selector 206 is the information of the so-called home page, publicized on the Internet, and the information of e.g. the E-mail, captured over modem 220.

The selector 206 is responsive to the switching control signal from the controller 230 to switch between the outputting of the TV broadcast signals from the demodulator 203, picture signals from the external input terminals 204, 205, and a variety of information signals, acquired over the modem 220 from the controller 230. The switching control signal, supplied from the controller 230 to the selector 206, is formed in the controller 230 responsive to the operating signal sent over a wireless route from the mobile display device 100.

An output signal from the selector 206 is supplied to the compression processor 207. The compression processor 207 compresses signals, supplied thereto, in accordance with a preset compression system. The compression processor 207 compresses signals from the selector 206, using a data compression system, such as MPEF system or wavelet system.

The signals compressed in the compression processor 207 are supplied to the transmission signal forming unit 208. The transmission signal forming unit 208 formulates transmission signals in conformity to the preset communication protocol. In the present embodiment, the base device 200 formulates transmission signals conforming e.g. to the protocol of the IEEE (Institute Electrical and Electronics Engineering) 802.11 system or a protocol derived therefrom.

The transmission signals, formulated in the transmission signal forming unit 208, are sent to the transmission processor 209, which is responsive to control signals from the controller 230 to modulate or amplify the transmission signals. The transmission signals, processed in the transmission processor 209, are transmitted, over a wireless route, to the mobile display device 100, via antenna co-using unit 210 and transmitting/receiving antenna 211. Similarly to the antenna co-using unit 102 of the mobile display device 100, the antenna co-using unit 210 prevents transmitted signals and received signals from interfering with each other.

Thus, the base device 200 selects picture signals or speech signals, selected by the tuners 202A, 202B, picture signals or speech signals, received from the external input terminals 204, 205 or picture signals or speech signals of the information acquired via modem 220, in accordance with an operating signal from the mobile display device 100, to supply the so selected data to the large format display device 300 from the output terminal 215 to the large format display device 300, over the connection cable 350 of FIG. 1. The base device also compresses the data and transmits the so compressed data to the mobile display device 100 over a wireless route in accordance with a preset communication protocol.

The touch panel 121, provided to the LCD 107 of the mobile display device 100 in the picture display system 1 of the present invention, and the remote control panel RP, displayed on the LCD 107, are further explained in detail.

Figure 4:
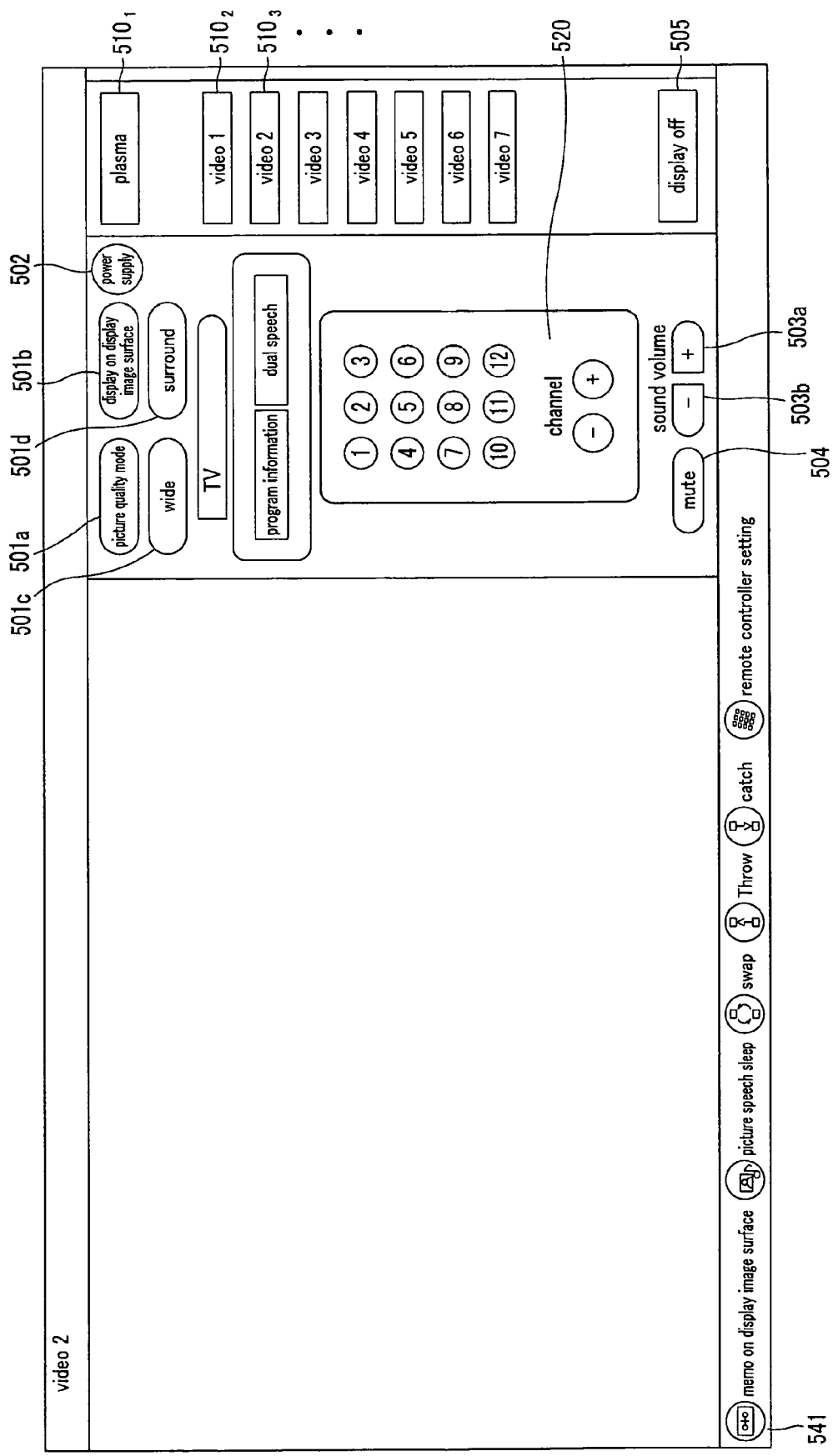
FIG. 4 is a schematic view showing a remote control panel demonstrated on a mobile display device.
Figure 5:
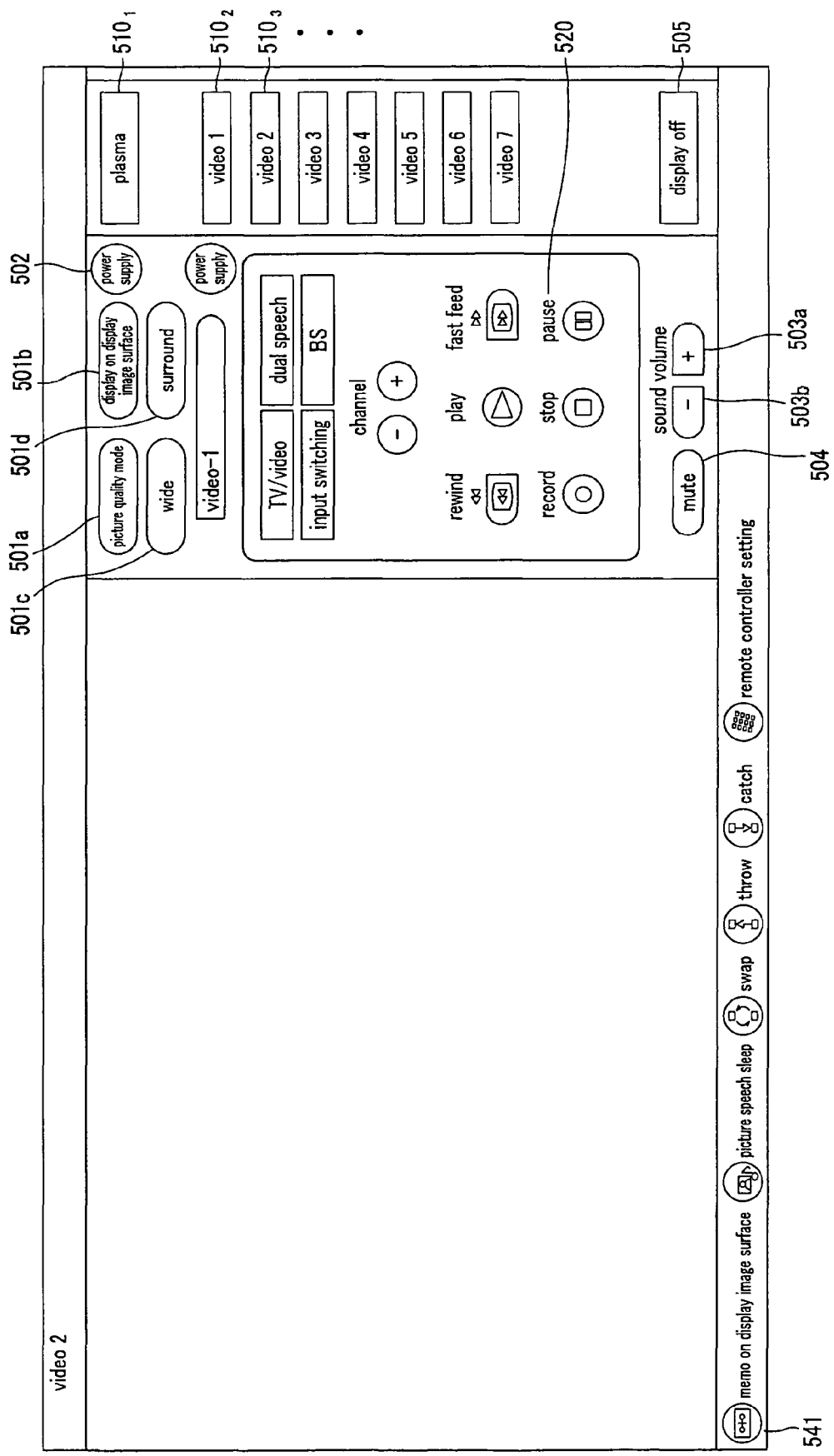
FIG. 5 is a block diagram showing a remote control panel for video demonstrated on the mobile display device.

FIGS. 4 and 5 show the remote-control panel RP, displayed on the LCD 107, and are schematic views showing the remote-control panel RP for TV and that for the video, respectively. Although FIGS. 4 and 5 show the case where only the remote-control panel RP on the LCD 107, an image similar to an image displayed on the large format display device 300 may be displayed in an area other than the area where the remote-control panel RP is displayed.

A remote controller for TV, shown in FIG. 4, may be displayed by acting on a remote-control button 123 shown in FIG. 1, provided on the mobile display device 100, or on a dedicated remote-control button, configured for displaying the remote-control panel RP for TV. The remote-control panel other than the remote controller for TV, that is, the remote-control panel for video, shown in FIG. 5, may be displayed by acting on a button provided to an index image surface, or on a device selection button provided to the remote controller for TV.

Referring to FIGS. 4 and 5, there are displayed, on the right side of the remote-control panel RP, a device selection button 5101 for selecting the base device 200 for demonstrating the images of the TV broadcast programs from the base device 200, and device selection buttons 5102, 5103, . . . , for selecting the external inputting devices 400 connected to the base device 200 for demonstrating various picture signals from the external inputting devices 400.

In FIG. 4, the device selection button 5101 has been selected and the remote-control panel RP for TV is displayed. In FIG. 5, the video device has been selected as the external inputting device 400, and the device selection button 5103 specifying the video device has been selected and the remote-control panel RP for video is displayed.

On these remote-control panels RP, there are provided, apart from the device selection buttons 5101, 5102, . . . , buttons 501a to 501d for switching between the picture quality mode, image surface display, wide display, surround and so forth, of the image displayed on the large format display device 300 and on the LCD 107 a button for the power supply of the large format display device 300, sound volume up button for sound volume adjustment 503a, a sound volume down button 503b, a mute button 504 and a display off button 505 for turning off the display on the remote control panel.

On the remote-control panel RP for TV, shown in FIG. 4, there are provided a display unit 520 for displaying a button for selecting the TV channel, and a set of buttons for TV operations, such as TV channel selection button or a TV channel up/down button. The remote-control panel RP for video, shown in FIG. 5, there is provided a display unit 530 for displaying a video power supply button, channel up/down buttons, operating buttons for video operations, such as record, play, rewind, fast feed, pause or stop buttons.

By acting on (touching) these buttons, the touch panel 121, provided on the surface of the LCD 107, detects a location acted on, and the controller 130 of the mobile display device 100 formulates operating signals, indicating e.g. sound volume adjustment commands for sound volume up/down, or station selection commands, such as channel up or channel down, to send the so formulated operating commands from the transmission processor 112 to the base device 200. The controller 230 of the base device 200 then performs sound volume adjustment or station selection in keeping with the operating signals.

Figure 6:
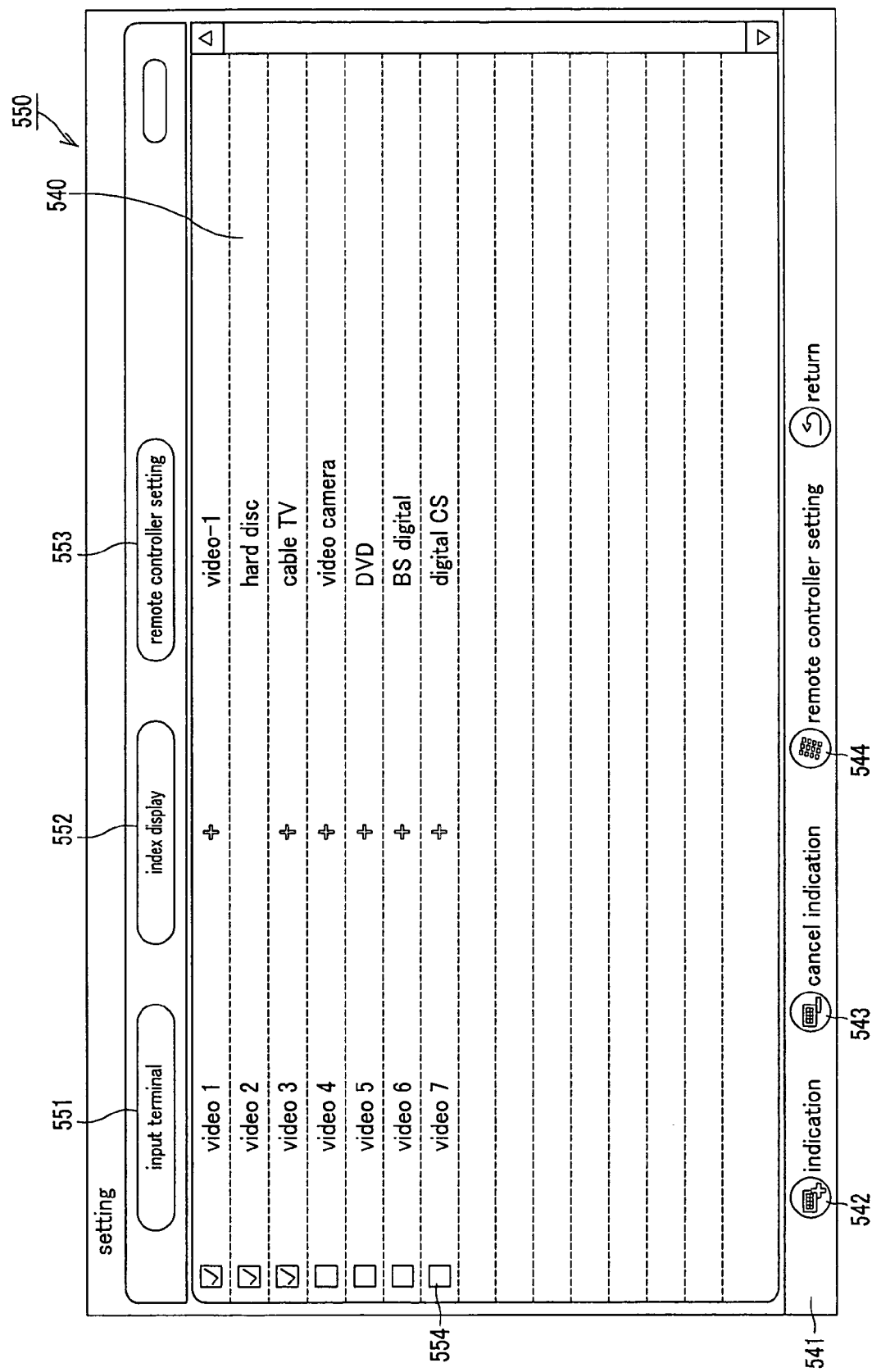
FIG. 6 is a schematic view showing an example of a setting image surface demonstrated on the mobile display device.

It is noted that the display of the remote-control panel RP is switched responsive to the selection of the device selection buttons 5102, 5103, . . . , used for selecting the external inputting devices 400, and that detailed setting of the device selection buttons 5102, 5103, . . . may be effected from the setting image surface. FIG. 6 depicts a schematic view showing an example of the setting image surface. As for this setting image surface, a setting image surface 550, shown in FIG. 6, may be displayed on a window 540 of the LCD 107, e.g. by acting on a dedicated button provided on the mobile display device 100, by acting on a dedicated button, provided on an index image surface, as later explained, or by acting on a remote-control setting button of an operating bar 541, provided on a lower part of the window, as shown in FIGS. 4 and 5.

Referring to FIG. 6, display columns 551 to 553, indicating the setting of the input terminal, index and the remote-control setting, are displayed on the setting image surface 550. An operating bar 541 having a variety of operating buttons is provided in a window 540 provided on the lower part of the setting image surface 550.

A display column 551 of the input terminal indicates the sort of the external inputting devices 400 connected to an external input terminal provided to the base device 200. In the present embodiment, there are provided seven connection terminals connectable to the seven external inputting devices 400 which are displayed in the columns of 'video 1' to 'video 7'.

An index display column 552 sets whether or not display is to be made in the index image surface as later explained. FIG. 6 shows a case where only the external inputting device ('video 2') is not displayed on the index image surface. The switching between display and no display on the index image surface is by checking a check box 554 provided for each of the input terminals of the setting image surface 550 and acting on (touching) the operating button provided to the operating bar 541 (display button 542/display cancel button 543).

A display column 553, specifying the remote controller setting, sets and demonstrates the sorts of the external inputting devices 400. In this remote control setting, more detailed setting may be made by checking the check box 554 provided for each input terminal of the setting image surface 550 and by acting on (touching) an operating button (remote-control setting button) 544 provided to the operating bar 541.

Figure 7:
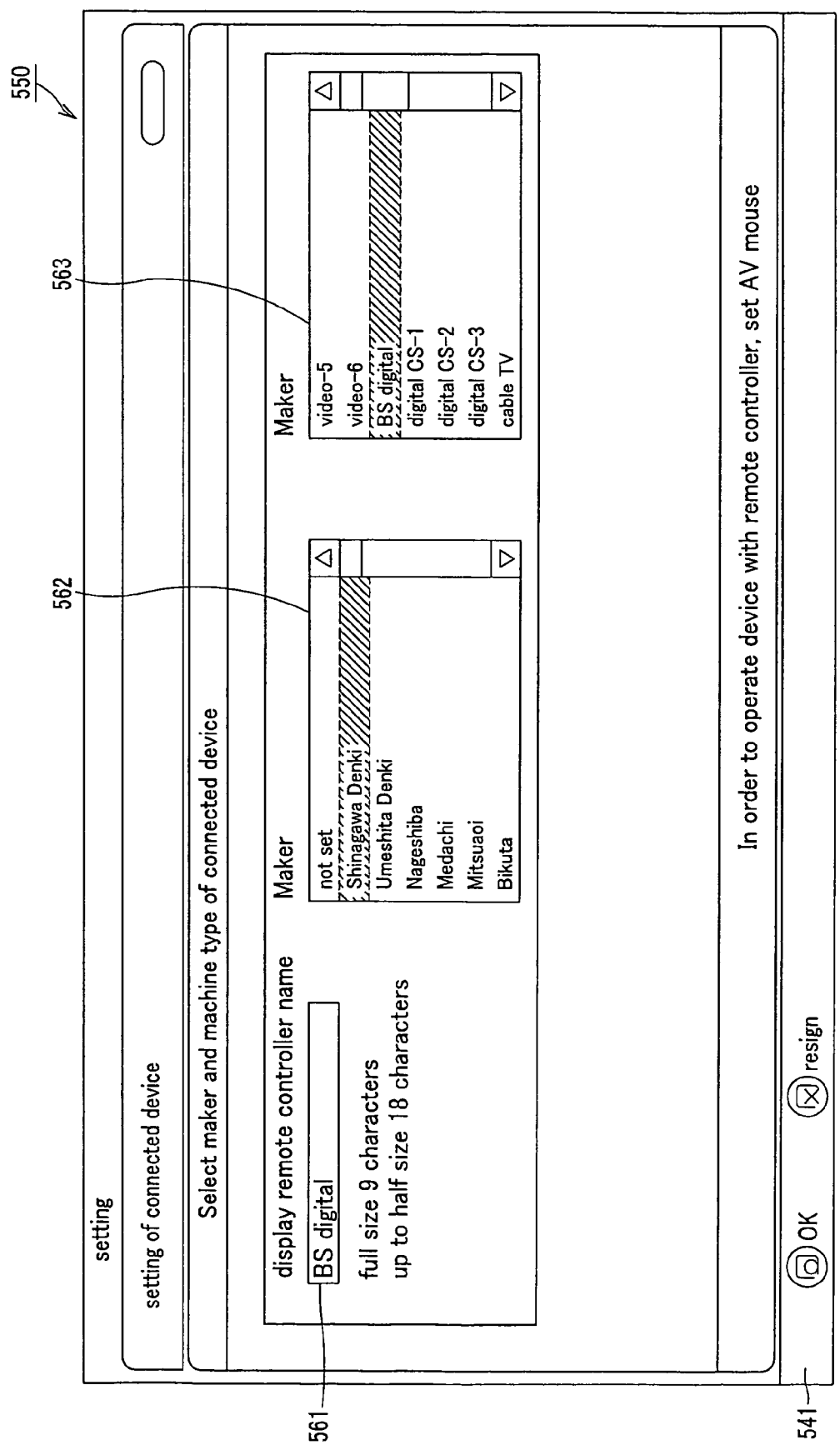
FIG. 7 is a schematic view showing an example of an image surface for setting details of the remote controller demonstrated on the mobile display device.

FIG. 7 depicts a schematic view showing an example of an image setting surface for setting detailed remote-control setting. Referring to FIG. 7, there are provided e.g. a remote controller name input column 561 for inputting the name for identifying the external inputting device 400, a manufacturer selecting column 562 for selecting the manufacturer of the external inputting device 400 corresponding to the name of the remote controller, and a machine type selecting column 563 for selecting the machine type thereof. The remote controller setting may be made for each of the external inputting devices 400.

Figure 8:
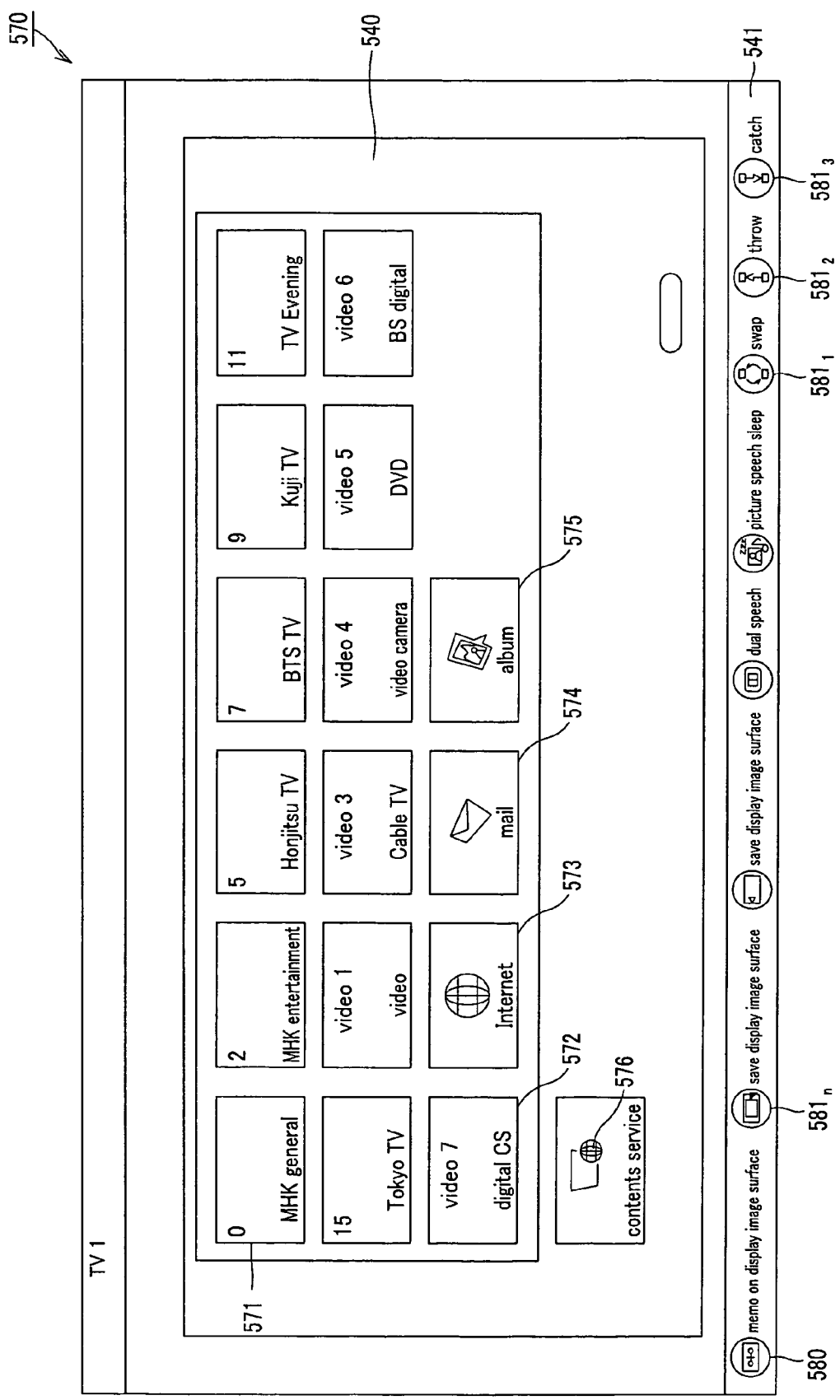
FIG. 8 is a schematic view showing an example of an index demonstrating image surface demonstrated on the mobile display device.

According to the present invention, the information of the external inputting devices 400, as set by e.g. the setting image surface 550, may be displayed by indexes. FIG. 8 shows an example of the index image surface. An index image surface 570 may be displayed on a window 540 by acting on a dedicated button, configured for displaying a remote control button 123 of FIG. 1 or the index image surface 570, provided to the mobile display device 100. The index image surface, shown in FIG. 8, is the index image surface 570 following the setting shown in FIGS. 6 and 7.

On the index image surface 570, there are displayed a channel selecting button 571 for switching and selecting TV channels, and a display button 572 associated with one of the external inputting devices 400 ('video 1' to 'video 7') connected to the input terminal and which has been specified for index display. It is noted that, in FIG. 6, the index display of the hard disc, as an external input device, connected to the second input terminal ('video 2'), is 'no display' and hence the button associated with this video 2 is not displayed. Apart from the button 572, associated with these external inputting devices 400, there are provided a button for connection to the Internet 573, a mail button 574 for transmitting/receiving a mail, and an album button 575, for reading out data, such as photos, saved in a memory of the base device 200 or the external inputting device. There is also provided a contents service button 576 for accepting contents services.

When e.g. the TV channel selection button 571 on the index image surface 570 is acted on (touched), the index image surface 570 is changed to remote-control display for video, shown in FIG. 4 and, when the video display button 572 is acted on (touched), the index image surface 570 is changed to a remote control display for video shown in FIG. 4. As described above, a button 510n indicating the sort of the external inputting device is displayed on the remote control panel for TV shown in FIG. 4 and on the remote control panel for video shown in FIG. 5. Since the index display for 'video 2' on the above setting image surface is 'no display', the button corresponding to the 'video 2' cannot be pressed (disabled). If the remote-control panel for video shown in FIG. 5 is displayed, 'video 1' is highlighted (indicated with a different color), whereas, if the remote-control panel for TV shown in FIG. 4 is displayed, 'video 2' is highlighted (indicated with a different color).

An operating bar 541 is provided in a lower part of the display window 540 of the index image surface 570. For example, there are provided the aforementioned button for displaying the setting image surface, shown in FIG. 6, and operating buttons 581n, such as image surface memo, image surface save, double speech, image sound sleeve, swap, throw and catch. For example, if the throw button, catch button or the swap button 5811-5813 are acted on (touched), the touch panel detects the touched positions and the controller 130 of the mobile display device 100 formulates operating signals indicating the throw command, catch command or the swap command, depending on the positions detected by the touch panel, to send the so formulated operating signals from the transmission processor 112 to the base device 200.

The base device 200 compresses picture and speech signals of the TV broadcast programs, selected by the tuner 202A, and transmits the so compressed data over a wireless route in accordance with the preset communication protocol to the mobile display device 100 to send the image signals or the speech signals of the TV broadcast programs as selected by the tuner 202B from the output terminal 215 of the base device 200 over the connection cable 350 to the large format display device 300. That is, the large format display device 300 and the mobile display device 100 are able to display different information signals, such as different images. In such case, the display contents, demonstrated on the large format display device 300, may be interchanged with the display contents, such as images, demonstrated on the mobile display device 100, so that the display contents, demonstrated on the large format display device 300, are demonstrated on the mobile display device 100, or so that, conversely, the display contents, demonstrated on the mobile display device 100, are demonstrated on the large format display device 300 (swapping), so that the display contents, demonstrated on the mobile display device 100, are demonstrated on the large format display device 300 as well (throwing) or so that the display contents, demonstrated on the large format display device 300, are demonstrated on the mobile display device 100 as well (catching).

For example, if the controller 230 of the base device 200 has received the throw command, the throw operation control on the side of the mobile display device 100 and that on the side of the large format display device 300 are carried out by parallel processing. More specifically, in the throw operation control, it is verified by the mobile display device 100 whether the throw operation is possible. If the throw operation is not possible because the counterpart party of communication is outside the sphere of wireless communication or because the base device 200 is the operation locked state, an error is displayed to terminate the throw operation control.

In case the throw operation is possible, an operation signal, indicating the throw command, is transmitted from the mobile display device 100 to the base device 200, and the processing of switching the receiving channel of the large format display device 300 to the receiving channel of the mobile display device 100 is invoked and executed to terminate the throw processing control.

On receipt of the invocation of the channel switching processing, the large format display device 300 performs image surface fadeout control and sound muting control as well as signal switching processing such as scan rate changing and subsequently cancels the image surface fadeout and speech muting to terminate the throw operation control.

By this throw operation control, the display contents of the large format display device 300 are changed over to the display contents of the mobile display device 100. In this throw operation, the display contents of the mobile display device 100 are not changed over, and the fact that the throw operation has been carried out is displayed.

On receipt of a catch command, the controller 230 of the base device 200 performs catch operation control on the side of the mobile display device 100 and that on the side of the large format display device 300 by the parallel processing. That is, in the catch operation control, the mobile display device 100 verifies whether or not the catch operation is possible. In case the throw operation is not possible because the counterpart party of communication is outside the sphere of wireless communication or because the base device 200 is the operation locked state, an error is displayed to terminate the catch operation control.

On the other hand, if the catch operation is possible, the side of the large format display device 300 acquires a receiving channel on the side of the large format display device 300, and the mobile display device 100 sends an operating command, indicating the catch command, to the base device 200, and invokes and executes the processing of switching the receiving channel of the mobile display device 100 to the receiving channel of the large format display device 300 to terminate the catch operation control. It is noted that the pictures and the speech on the side of the mobile display device 100 are muted during the time of execution of interchanging the receiving channels of the mobile display device 100.

In case the large format display device 300 has accepted the invocation of the processing of interchanging the received channels, channel interchanging is not carried out, and the fact that the receiving channel has been caught is displayed by the OSD processor 105 on the side of the mobile display device 100 and the catch indication by the OSD processor 105 is then canceled to terminate the catch operation control.

By this catch operation control, the display contents of the large format display device 300 are not changed over and the catch display is carried out by the OSD processor 105. The display contents of the mobile display device 100 are changed over to the display contents of the large format display device 300.

On receipt of the swap command, the controller 230 of the base device 200 performs swap operation control for the side of the mobile display device 100 and for the side of the large format display device 300 by parallel processing. In the swap operation control, it is verified by the mobile display device 100 whether the swap operation is possible. If the catch operation is not possible because the counterpart party of communication is outside the sphere of wireless communication or because the base device 200 is the operation locked state, an error is displayed to terminate the throw operation control.

In case the swap operation is possible, an operation signal, indicating the swap command, is transmitted from the mobile display device 100 to the base device 200, and the processing of switching the receiving channel of the mobile display device 100 to the receiving channel of the large format display device 300 is invoked and executed. The mobile display device 100 acquires the receiving channel of the large format display device 300 and changes over the receiving channel of the mobile display device 100 to the receiving channel of the large format display device 300 to terminate the throw processing control. During the time of execution of the switching the receiving channel on the side of the mobile display device 100, the image and the sound on the side of the mobile display device 100 are muted.

On receipt of the invocation of the channel switching processing, the large format display device 300 performs image surface fadeout control and sound muting control as well as signal switching processing such as scan rate changing and subsequently cancels the image surface fadeout and speech muting to terminate the swap operation control.

By this swapping operation control, the display contents of the large format display device 300 are changed over to the display contents of the mobile display device 100, while the display contents of the mobile display device 100 are changed over to the display contents of the large format display device 300.

In the foregoing, explanation has been made of the image surface interchanging processing, that is, the interchanging of the image display surface of the TV broadcast program, selected by the tuners 202A, 202B of the base device 200, between the mobile display device 100 and the large format display device 300, that is, the throw operation control, catch operation control and the swap operation control. However, in case the BS program, provided by BS signals, selected by the STB, is viewed, or in case the VTR or the DVD device is connected as the external inputting devices 400 to the base device, and a motion picture, for example, adapted to be reproduced by these VTR or DVD devices, is viewed, it is possible with the present picture display system 1 to interchange the reproduced images by a similar sequence of operations under control by the selector 206.

With the present picture display system 1, it is possible, by the operation of a lock switch, not shown, provided in the base device 200, not to accept the throw operation control, catch operation control or the swap operation control by the button operation control.

Figure 9:
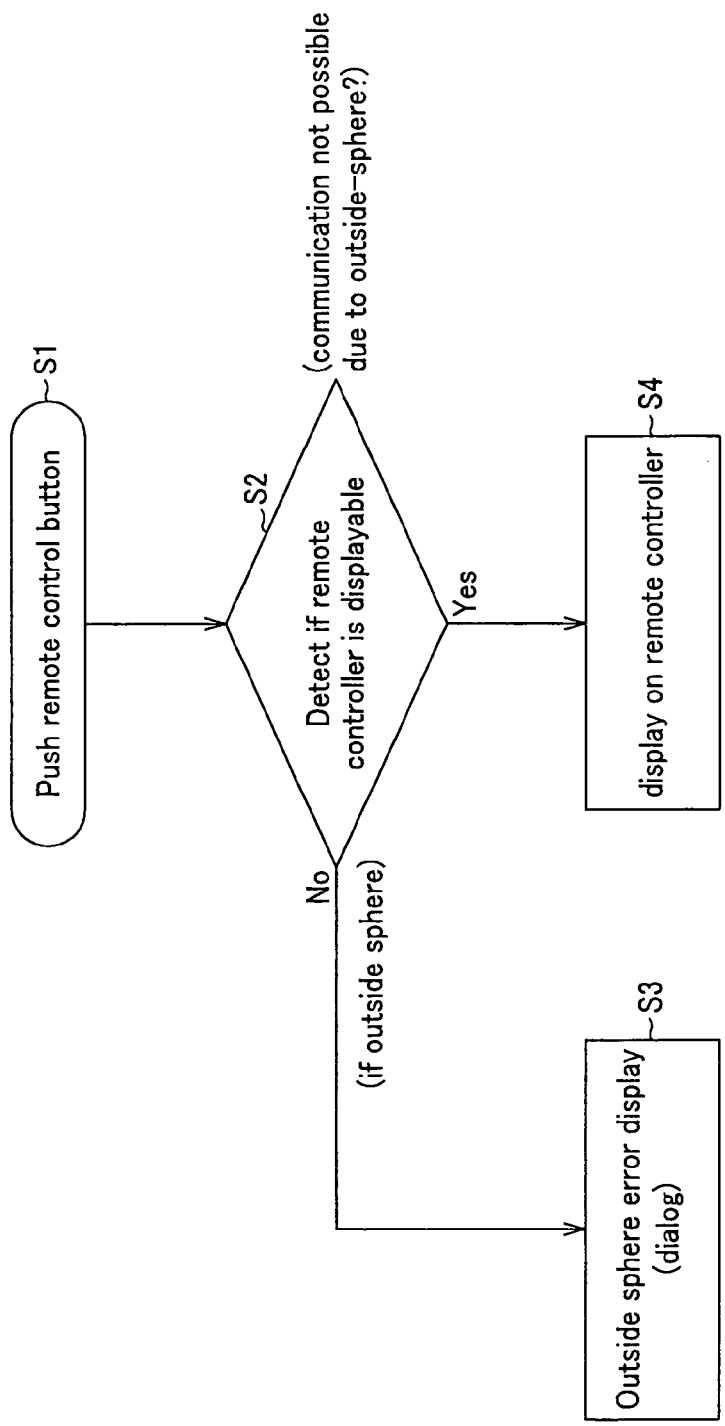
FIG. 9 is a flowchart showing the operation in demonstrating a remote control panel RP by the mobile display device.
Figure 10:
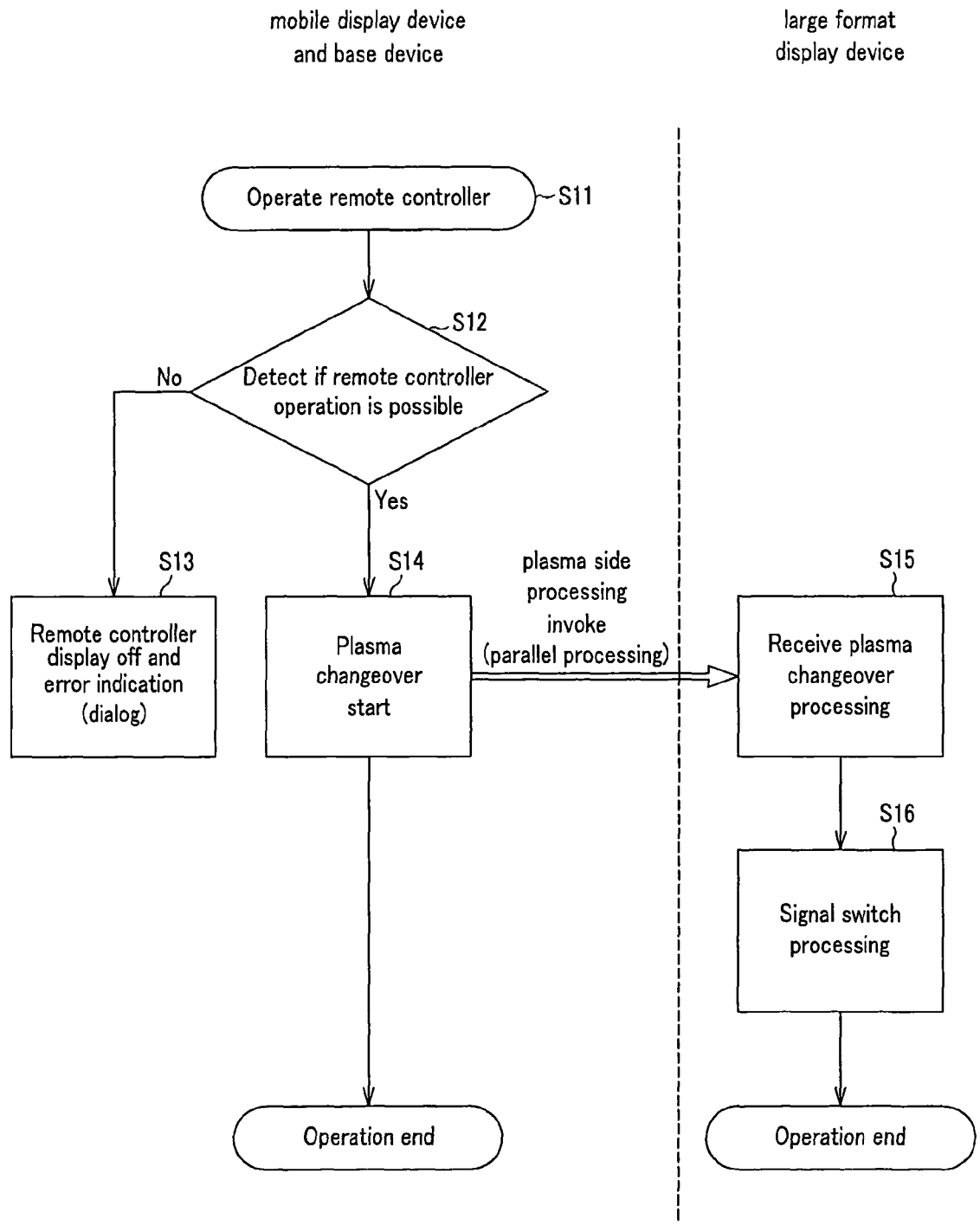
FIG. 10 is a flowchart showing the operation of the mobile display device, base device and a large format display device in effecting remote controlling processing by the remote control panel RP.
Figure 11:
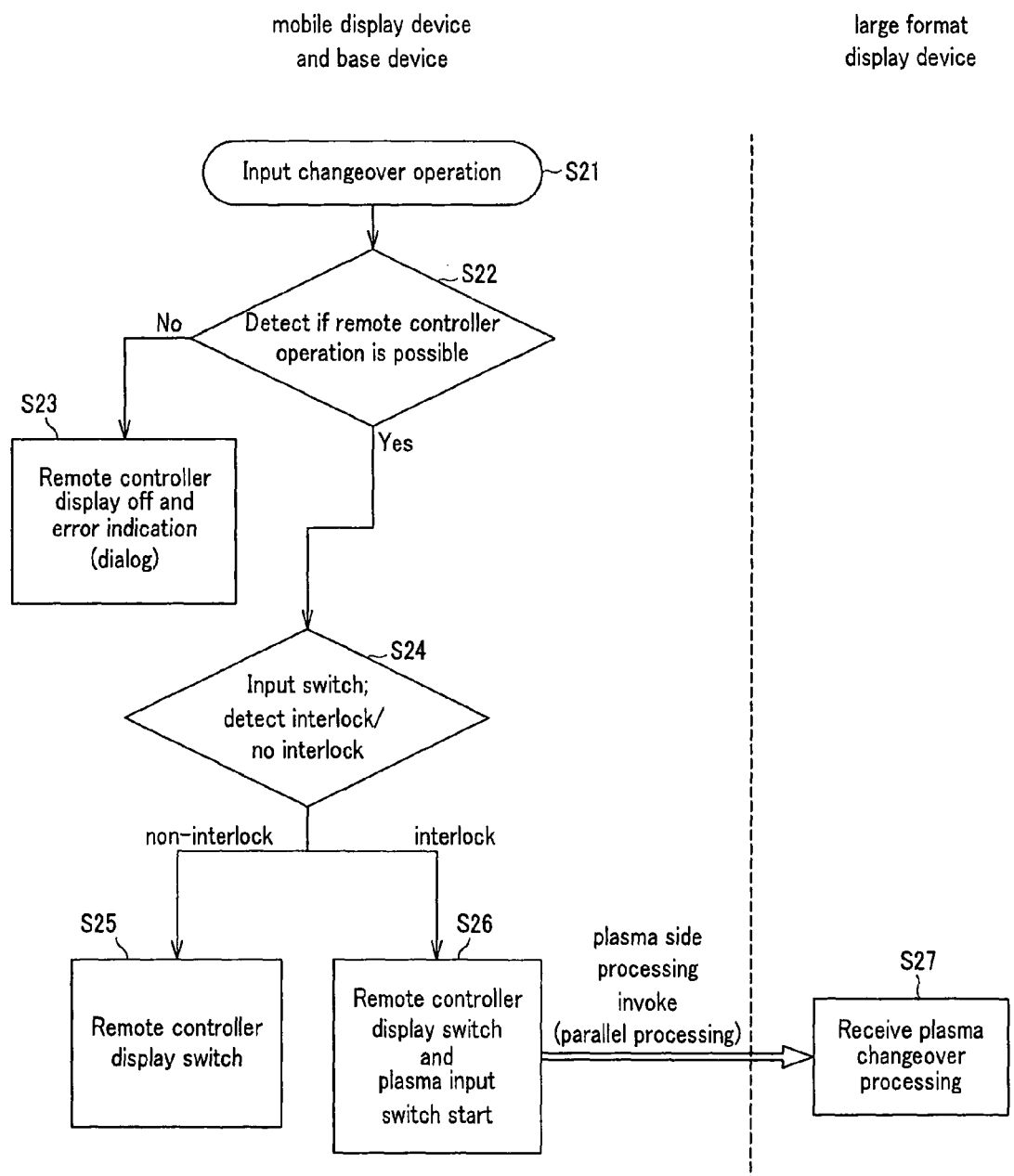
FIG. 11 is a flowchart showing the operation of the mobile display device, base device and a large format display device in effecting input switching operations of the remote control panel RP and the large format display device.

The operation of the remote-control panel RP and the touch panel 121, provided to the mobile display device 100, is hereinafter explained. FIGS. 9 to 11 depict flowcharts for illustrating the operation in displaying the remote-control panel RP.

Referring to FIG. 9, when the user presses the remote-control button 123 (step S1), the controller 130 of the mobile display device 100 detects whether or not the remote-control panel RP is displayable (step S2). Specifically, since the mobile base device 200 is communicating with the base device 200 over a wireless route, it is detected whether or not the base device 200 is able to communicate with the mobile display device 100, such as by not being outside the sphere of wireless communication. If detection is not possible, the 'outside sphere' error display is made on the LCD 107 (step S3). If detection is possible, the remote-control panel RP is displayed on the LCD 107 (step S4).

In case the remote-control panel RP is displayed, it is possible, with the use of the mobile display device 100, to change the TV channel in case broadcast signals are supplied to the large format display device 300, or to remote-control the external inputting devices connected to the base device. In performing the remote-control operation, when the remote-control panel RP is actuated, this actuation is detected by the touch panel (step S11) in FIG. 10. It is then detected, by the controller 130 of the mobile display device 100, whether or not the remote-control operation is possible (step S12). In the present embodiment, detection of whether or not the remote control operation is possible is made each time the user acts on the remote-control panel RP (touches the touch panel). Alternatively, detection may be made periodically, at a preset time interval, or it may be detected at all times whether or not the remote control operation is possible. In case the remote control operation is not possible, the display of the remote-control panel RP on the LCD 107 is turned off and an error is indicated on the LCD 107 (step S13). If conversely it is detected in the step S11 that the remote control operation is possible, and the user has acted on a button on the remote-control panel RP, the touch panel 121, provided on the surface of the LCD 107, detects the contact site. The controller 130 of the mobile display device 100 generates an operating signal, responsive to the detected contact position, to send the so generated operating signal from the transmission processor 112 to the base device 200. On receipt of the operating signal, the controller 230 of the base device 200 invokes the processing of switching the image signals to be supplied to the large format display device 300 (step S314) to complete the processing. This switches the display of the large format display device 300.

When the operating signal from the mobile display device 100 has been sent to the base device 200, the base device 200 transmits a control signal for switching processing, attendant on the changing of e.g. the image signals supplied, to the large format display device 300, as a parallel operation to the operation control of the step S14. On receipt of the switching processing control signal from the base device 200 (step S15), the large format display device 300 effects image surface fadeout and speech muting (step S16) as well as signal switching processing, such as scan rate changing, and subsequently cancels the image surface fadeout and speech muting to complete the operation.

The operation in case of switching the image signals supplied to the large format display device 300 is now explained. The remote control operation is possible only when the remote-control panel RP is displayed on the LCD 107 of the mobile display device 100, as described previously. By way of an example, such a case is explained in which, as a TV image is displayed on the large format display device 300, an input switching operation has been effected, that is, a 'video' button is actuated from the remote-control panel RP. In case the 'video' button is actuated, that is, touched, the touch panel detects it (step S21) and the controller 130 of the mobile display device 100 detects whether or not the remote control operation is possible (step S22). In case it has been detected that the remote control operation is not possible, the display of the remote-control panel RP is turned off and, in its stead, an error indication is displayed (step S23). If it has been detected that the remote control operation is possible, it is then detected that whether the input switching, as later explained, is interlocked or not interlocked (step S24). If it has been detected that the input switching is not interlocked, only the display on the remote-control panel RP, demonstrated on the mobile display device 100, is switched to the remote-control panel for video (step S25). If it has been detected that the input switching is interlocked, processing is carried out such that the display on the remote-control panel RP and that on the large format display device 300 are changed over simultaneously (step S26). That is, when an operating signal is sent from the mobile display device 100 to the base device 200, the base device 200 sends a control signal for effecting the switching processing for the large format display device 300 to the large format display device 300, as a parallel operation to the operation control of step S26. On receipt of the changeover processing control signal from the base device 200 (step S27), the large format display device 300 effects image surface fadeout and sound muting as well as signal switching processing such as scan rate changing and subsequently cancels the image surface fadeout and speech muting to terminate the operation. This changes over the display of the large format display device 300.

The interlock/no interlock of the input switching in the above step S24 is now explained. In the above explanation, it is assumed that image signals from the preset external inputting device 400 can be supplied to the large format display device 300 by detecting the operation of the device selection button of the remote-control panel RP by the touch panel, by changing over the display on the remote-control panel RP based on the detected results, and by remote-controlling the base device 200 to select one of the external inputting devices 400 to supply the image signals from the preset external inputting device 400 to the large format display device 300. That is, in case the sole external inputting device is connected to each external inputting device, the device selection buttons 5102, 5103, . . . , shown in FIG. 5, are able to switch and select the external inputting devices in association operatively with the switching selection of the external input terminal by the base device 200. However, there are occasions where plural external inputting devices are connected, via e.g. an amplifier, to the sole external input terminal of the base device 200.

Figure 12:
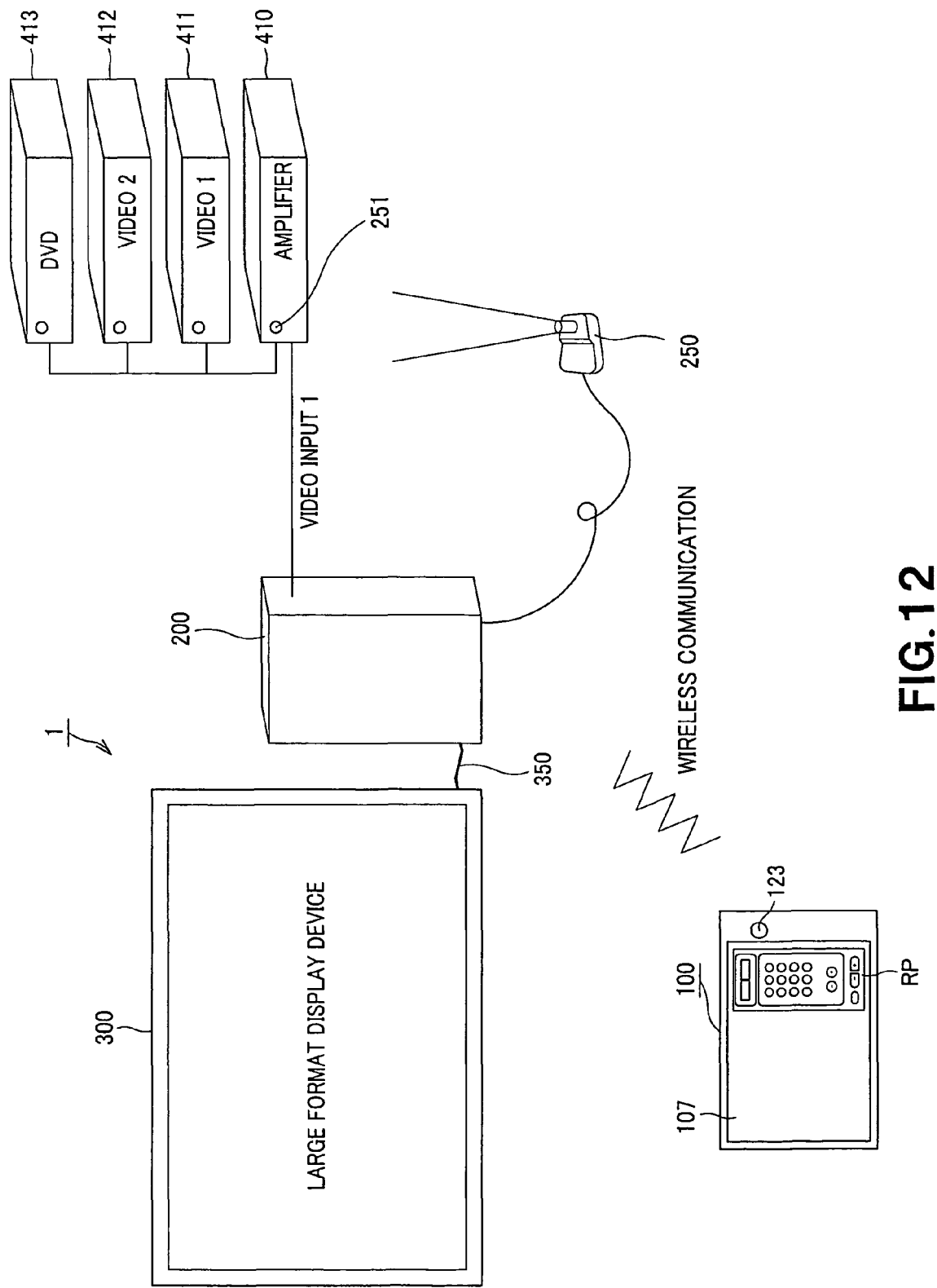
FIG. 12 is a schematic view showing a picture display system in case a number of external inputting devices are connected via amplifiers to an external input terminal of the base device.

FIG. 12 depicts a schematic view showing an image display system in case plural external inputting devices are connected, via e.g. an amplifier, to the external input terminal of the base device 200. Referring to FIG. 12, an amplifier 410 is connected to an external input terminal associated with the video input 1 of the base device 200. To this amplifier are connected plural external input devices, such as video devices 411, 412, a DVD 413, tuners or TV receivers.

In such case, each device selection button is associated with the sole external input terminal, so that the device selection button, associated with the external input terminal, connected to the amplifier 410, is unable to select the plural external input devices 411, 412, 413, . . . , connected thereto via amplifier 410. Thus, a button for setting interlock/no interlock is provided on e.g. a setting image surface of the mobile display device 100, so that, if plural external inputting devices 400 are connected to a sole external input terminal, it is possible to switch the device selecting operation by the remote-control panel and the touch panel and the operation of switching the external input terminal of the base device 200 to non-interlock. In case of the setting to non-interlock, only the remote-control panel RP, demonstrated on the mobile display device 100, may be switched, without changing over the input of the large format display device 300.

Figure 13:
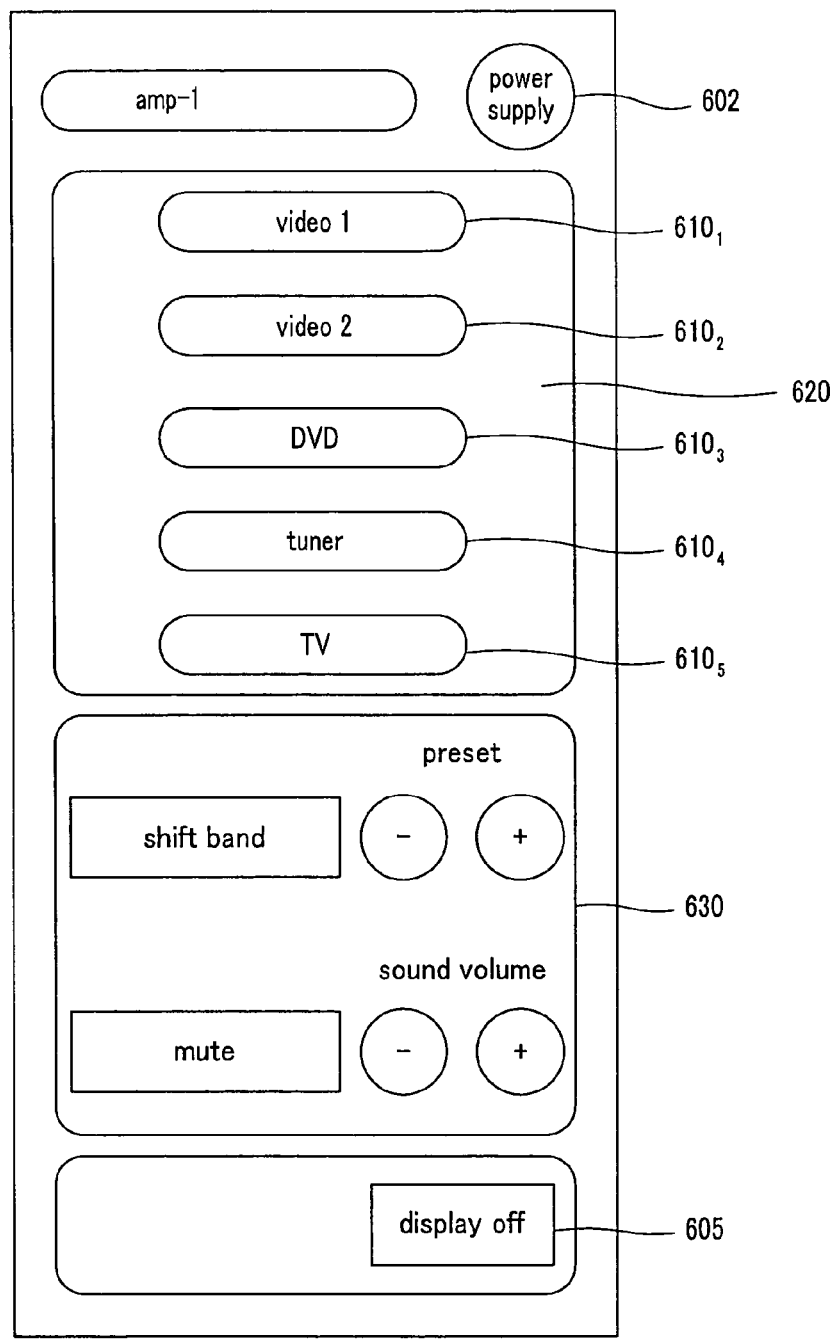
FIG. 13 is a schematic view showing a remote control panel for an amplifier demonstrated on the mobile display apparatus.

In case plural external inputting devices 400 are connected to the amplifier 410, the machine type, for example, of the external input device is set on the setting image surface, in the same way as described above. If, in this case, the device selection button for selecting the external input terminal, connected to the amplifier 410, is actuated, the remote-control panel RP for actuating the amplifier shown in FIG. 13 is displayed. Similarly to the remote-control panel RP, shown in FIGS. 4 and 5, the remote-control panel RP for actuating the amplifier is provided with a power supply button 602 for turning the power supply of the amplifier 410, a display off button 605 for deactivating the display of the remote-control panel RP, and with a device selection operation display unit 620, having displayed thereon device selection buttons 610n (6101, 6102, 6103, . . . ) associated with the external input devices 411, 412, 413, . . . , connected to the amplifier 410, as shown in FIG. 13. By the device selection buttons 610n, it is possible to switch inputs to the amplifier 410. Thus, a desired one of the external inputting devices 400, connected to the amplifier 410, may be selected to supply the desired image to the base device 200. It is also possible to provide an operating button display unit, such as a button for adjusting the sound volume.

Figure 14:
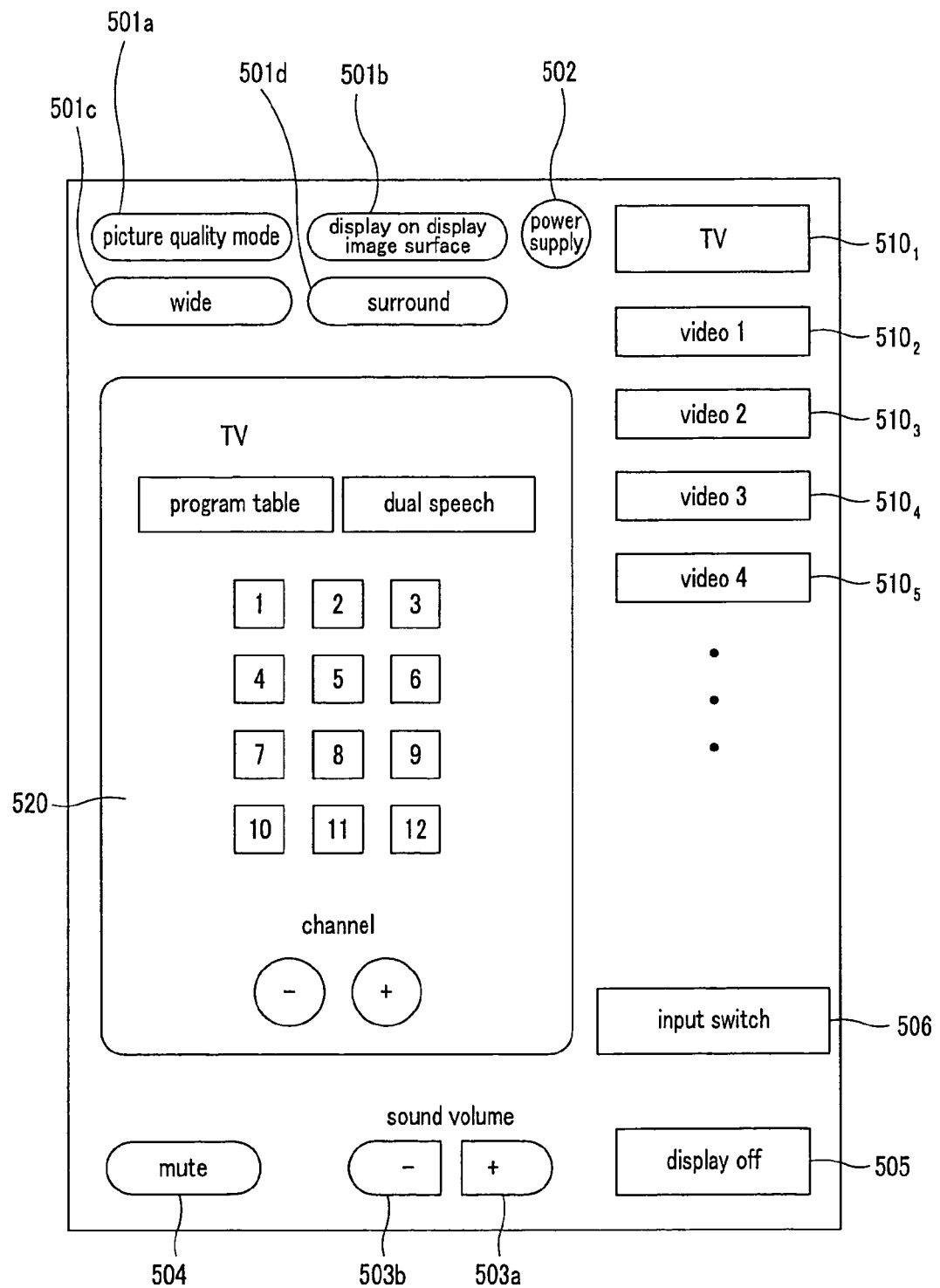
FIG. 14 is a schematic view for a television receiver demonstrated on the mobile display device in case of non-interlocked input switching.
Figure 15:
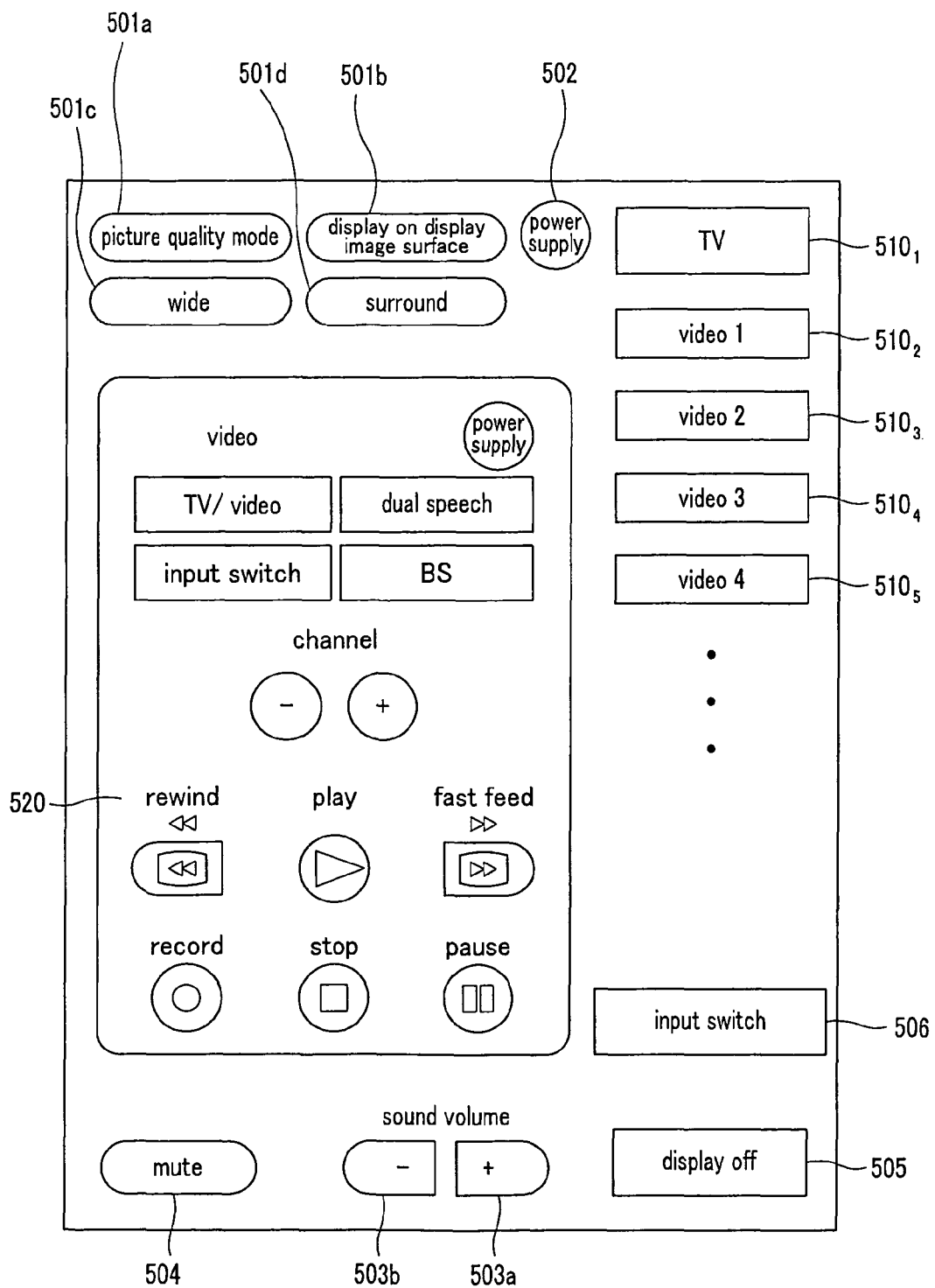
FIG. 15 is a schematic view for a video tape recorder demonstrated on the mobile display device in case of non-interlocked input switching.

FIGS. 14 and 15 are schematic views showing a remote-control panel for TV and a remote-control panel for video when the input switching is of the non-interlocked type. In FIGS. 14 and 15, the functional buttons, which are the same as those of the remote-control panel shown in FIGS. 4 and 5 are depicted by the same reference numerals, and detailed explanation therefor is omitted for simplicity.

Referring to FIGS. 14 and 15, an input switching button 506 is indicated below the device selection buttons 5101, 5102, . . . , displayed on the right side of the remote-control panel RP. This input switching button 506 is displayed only for input switching non-interlock time. It may be set by the user, with the aid of the setting image surface, whether the switching of the device selection buttons 510n and the selective switching of the external input terminal of the base device 200 is to be of the interlock type or the non-interlock type (interlock/non-interlock of the input switching).

When the input switching button 506 is displayed, with the input switching being of the non-interlocked type, display is switched to the remote-control panel RP, associated with the pre-set device, in the case of the mobile display device 100, by the operation of the device selection buttons 510n. However, display on the large format display device 300 is not switched, in distinction from the case where the input switching is of the interlocked type. Hence, with the device selection buttons 510n, the switching selection of the external input terminals of the base device 200 is not possible. Consequently, when the input switching is non-interlock and the external input terminals are to be switched, the input switching button 506 is actuated (touched) and this operation is detected by the touch panel 121, whereby the operating signal is sent to the base device 200, so that the base device 200 sequentially selects the external input terminals.

First, the user selects the external input terminal, connected to the amplifier 410 of the base device 200, by the input switching button 506, to display the remote-control panel RP for actuating the amplifier 410 shown in FIG. 13. By selecting the target external inputting device, from this remote-control panel RP for operating the amplifier, and by acting on the device selecting button 510n provided on the right side of each remote-control panel RP or the index image, the remote-control panel RP associated with the target external input device is displayed. That is, if the target of the operation is the TV or the video, the remote-control panel for TV shown in FIG. 14, or the remote-control panel for video shown in FIG. 15, is displayed, respectively. Using the remote-control panel RP and the touch panel 121, the base device 200 is remote-operated to display a preset image on the large format display device 300.

The above-described embodiment is directed to the image display system 1, made up by the mobile display device 100, base device 200 and the large format display device 300 with the image signals supplied from the base device 200 being displayed on the mobile display device 100 and the large format display device 300. Alternatively, the base device 200 may be designed to send image signals to plural mobile display devices 100 and to the large format display device 300 by wireless signal transmission or by wired signal transmission.

The present invention has been explained for the case in which the base device includes tuner means, TV broadcast programs are selected responsive to actuating signals sent from the mobile display device 100, responsive in turn from the user's command, and the corresponding picture signals are sent to the large format display device 300. In this case, tuner means may be provided as the external inputting devices 400, or tuner means may be provided to the large format display device 300. In this case, the operating signals from the mobile display device 100 may be supplied via base device 200 to the external inputting devices 400 or to the large format display device 300 to control the tuner means to select picture signals.

The present invention has been explained for the case where the touch panel (contact position detection means) for detecting the contact position on the display image surface of the LCD 107 is provided to accept the operating input from the user. However, according to the present invention, the means for accepting the operating input from the user is not limited is not limited to the touch panel. For example, the operating input accepting means may be external devices, such as pointing means, such as mouse or trackball, or an operating input means, composed of a cross-button and a decision button, apart from the LCD 107. A plural number of the above-described operation inputting means may be provided instead of one of the operation inputting means.

In the above-described image display system 1 according to the present invention, the base device 200, interconnecting a variety of the information transmitting mediums, such as external inputting devices, ground wave TV broadcast or communication networks, such as the Internet, on one hand, and the mobile display device 100 or the large format display device 300, on the other hand, is remote-operated by the mobile display device 100, capable of bi-directional communication with the base device 200 over a wireless route, to transmit information signals, such as picture or speech signals of TV programs, picture data or speech data obtained from the communication network over the modem of the base device 200, or picture or speech signals of BS broadcast programs from e.g. the STB of the external input devices, connected to the base device 200, to the large format display device 300, to display a desired image on the large format display device 300.

Since the mobile display device 100 according to the present invention is small-sized and lightweight, and is connected to the base device 200 by wireless communication, so that it may be carried about conveniently. The user may take it to any place within the sphere of possible communication with the base device 200 and may reproduce and output the information signals provided by the base device 200 on the large format display device 300 for presentation to the user.

Moreover, by the operation on the mobile display device 100, the user is able to acquire the information of the so-called home pages, provided on the Internet, to view the information on the Internet, to receive an E-mail addressed to the user for display on the LCD 107 or to prepare and transmit the E-mail to the target counterpart party.

It is to be noted that, as may be apparent to those skilled in the art, various changes, substitutions or corrections may be envisaged without departing from the scope and the spirit of the present invention as defined in the appended claims.

INDUSTRIAL APPLICABILITY

The picture display system according to the present invention includes first and second display devices and a base device for supplying picture signals to at least the first display device, wherein the first display device includes a picture display unit for displaying the picture signals supplied from the base device, the second display device includes a display unit for displaying the display information for operation, for accepting an operating input from a user, an operating input accepting means for accepting an operating input from a user, an operating signal generating means for generating operating signals conforming to display items of the display information for operation, as specified by the operating input accepting means, and a communication means for transmitting the operating signals to the base device. The base device includes a picture signal outputting means for outputting the picture signals at least to the first display device, a communication means for receiving the operating signals at least from the second display device, an external input device connecting means for connecting the base device to an external input device as a source of supply of the picture signals, and a control signal transmitting means for transmitting an external input device control signal, controlling the external input device, based on the operating signal, to the external input device. The second display device may generate an operating signal, in keeping with the operating input from the user, to transmit the so generated operatig signal to the base device. The external input device, connected to the base device, as a supply source of the picture signals, connected to the base device, is controlled to send desired picture signals to the first display device for display thereon. The second display device, accepting the operations from the user, may be operated as a remote operating device for the first display device.

The invention claimed is:

1. A picture display system comprising:
   a first display device;
   a remote controlling device;
   a base device for supplying a plurality of picture signals to at least one of the first display device or the remote controlling device; and
   an external input device for supplying the plurality of picture signals to the base device, wherein:
   the first display device includes a picture display unit for displaying a first picture signal supplied from the base device;
   the remote controlling device includes:
      a display unit for displaying:
         a second picture signal supplied from the base device; and
         a remote control panel including a plurality of buttons for switching image modes and accepting an operating input from a user;
      an operating input accepting means for accepting the operating input from the user;
      an operating signal generating means for generating operating signals conforming to display items of display information for operation as specified by the operating input accepting means;
      an input switch having an interlock function and a non-interlock function, wherein the input switch receives an user input to activate the interlock function or the non-interlock function,
      wherein when the interlock function is activated, picture signals input into and displayed on the first display device and the remote controlling device are interlocked such that when the second picture signal input into and displayed on the remote controlling device is switched to a third picture signal that is input into and displayed on the remote controlling device, the first picture signal input into and displayed on the first display device is simultaneously changed to the third picture signal that is input and displayed on the first display device; and
      a communication means for transmitting the operating signals to the base device.

2. The picture display system according to claim 1, wherein the operating input accepting means of the remote controlling device includes a contact position detection means for detecting a contact position on a display surface of the display unit; and
   the operating signal generating means generates an operating signal conforming to a display item of the display information for operation displayed at a contact position on the display surface detected by the contact position detection means.

3. The picture display system according to claim 1, wherein the base device further includes a communication means that transmits a response signal to an operating signal to the remote controlling device; and
   the communication means of the remote controlling device receives the response signal.

4. The picture display system according to claim 1, wherein the base device further includes a tuner means and sends picture signals selected by the tuner means, based on operating signals generated by a picture signal outputting means included in the base device, to the first display device.

5. The picture display system according to claim 1, wherein the first display device further includes a tuner means and displays picture signals selected by the tuner means, based on an operating signal from the base device, on the picture display unit.

6. The picture display system according to claim 1, wherein the base device includes a control signal transmitting means that transmits an external input device control signal for the external input device over a wireless route.

7. The picture display system according to claim 6, wherein the control signal transmitting means of the base device converts the external input device control signal, transmitted over the wireless route, into infrared signals, which are output.

8. The picture display system according to claim 1, wherein the base device further includes a receiving means connected to a communication network for receiving information signals transmitted through the communication network, and a transmission control means for controlling the transmission of the information signals to a specified display device.

9. The picture display system according to claim 1, wherein the base device further includes transmission information transmitting means that sends transmission information over a communication network to a target counterpart.

10. The picture display system according to claim 1, wherein
the base device further includes an external input device connecting means connected, via an amplifier, to the external input device as the source of supply of the image signals.

11. A picture displaying method of a picture display system including a first display device including a picture display unit for displaying a first picture signal, a remote controlling device including a display unit for displaying a second picture signal, a base device for supplying a plurality of picture signals to at least one of the first display device or the remote controlling device, and an external input device for supplying the plurality of picture signals to the base device, the method comprising:
accepting an operating input from a user based on a remote control panel displayed on a display image surface of the remote controlling device, the remote control panel including:
a plurality of buttons for switching image modes; and
an input switch having an interlock function and a non-interlock function, wherein the input switch receives an user input to activate the interlock function or the non-interlock function,
wherein when the interlock function is activated, picture signals input into and displayed on the first display device and the remote controlling device are interlocked such that when the second picture signal input into and displayed on the remote controlling device is switched to a third picture signal that is input into and displayed on the remote controlling device, the first picture signal input into and displayed on the first display device is simultaneously changed to the third picture signal that is input and displayed on the first display device;
generating an operating signal conforming to the operating input;
transmitting the operating signal to the base device via bidirectional communication means exchanging signals between the remote controlling device and the base device; and
controlling the external input device as a supply source of the picture signals based on the operating signal.

12. The picture displaying method according to claim 11, further comprising:
controlling a tuner of the base device by the operating signal; and
displaying picture signals, selected by the operating signal, on the first display device.

13. The picture displaying method according to claim 11, further comprising:
controlling a tuner of the base device by the operating signal; and
displaying picture signals, selected by the operating signal, by the picture display unit.

14. The picture displaying method according to claim 11, further comprising:
receiving information signals coupled to a communication network and transmitted over the communication network; and
managing control so that the information signals are transmitted to a specified display device.

15. The picture displaying method according to claim 11, further comprising:
transmitting transmission information, over a communication network, to a target counterpart.

16. A display remote controlling apparatus comprising:
a communication means for:
exchanging signals with a base device connected to an external input device as a supply source of a plurality of picture signals; and
supplying a first picture signal to at least one picture display device;
a display means for:
displaying a second picture signal and a remote control panel; and
accepting an operating input from a user,
the remote control panel including:
a plurality of buttons for switching image modes; and
an input switch having an interlock function and a non-interlock function, wherein the input switch receives an user input to activate the interlock function or the non-interlock function,
wherein when the interlock function is activated, picture signals input into and displayed on the at least one picture display device and the display remote controlling apparatus are interlocked such that when the second picture signal input into and displayed on the display means is switched to a third picture signal that is input into and displayed on the display means, the first picture signal input into and displayed on the at least one picture display device is simultaneously changed to the third picture signal that is input and displayed on the at least one display device;
an operating input accepting means for accepting the operating input from the user; and
an operating signal generating means for generating an operating signal conforming to the operating input; wherein
the operating signal is sent over the communication means to the base device and the base device sends a preset image signal from the external input device to the at least one picture display device for display.

17. The display remote controlling apparatus according to claim 16, wherein
the operating input accepting means includes a contact position detection means provided on a display image surface of the display means for detecting a contact position on the display image surface; and
the operating signal generating means generates an operating signal, displayed at a contact position on the display image surface detected by the contact position detection means, conforming to a display item of display information for operation.

18. The picture display system according to claim 1, wherein
the remote control panel includes a switching button for switching the picture signals when the switching button is activated.

19. The picture display system according to claim 1, wherein
the base device includes:
a picture signal outputting means for outputting the picture signals to at least one of the first display device or the remote controlling device;
a communication means for receiving the operating signals from at least the remote controlling device;
an external input device connecting means for connecting the base device to the external input device as a source of the picture signals; and
a control signal transmitting means for transmitting an external input device control signal to the external input device and controlling the external input device based on the operating signals.

* * * * *